(12) United States Patent
Kogure et al.

(10) Patent No.: US 10,604,174 B2
(45) Date of Patent: Mar. 31, 2020

(54) MOTOR CONTROL UNIT AND ELECTRIC POWER STEERING APPARATUS EQUIPPED WITH THE SAME

(71) Applicant: NSK LTD., Tokyo (JP)

(72) Inventors: Teruyoshi Kogure, Tokyo (JP); Shigeru Shimakawa, Tokyo (JP); Shin Kumagai, Tokyo (JP); Ryoichi Suzuki, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/080,061

(22) PCT Filed: Mar. 2, 2017

(86) PCT No.: PCT/JP2017/008227
§ 371 (c)(1),
(2) Date: Aug. 27, 2018

(87) PCT Pub. No.: WO2017/150652
PCT Pub. Date: Sep. 8, 2017

(65) Prior Publication Data
US 2019/0092382 A1    Mar. 28, 2019

(30) Foreign Application Priority Data

Mar. 4, 2016  (JP) ................................ 2016-042217
Mar. 4, 2016  (JP) ................................ 2016-042218
Mar. 4, 2016  (JP) ................................ 2016-042219

(51) Int. Cl.
*B62D 5/04*        (2006.01)
*H02P 6/12*        (2006.01)
(Continued)

(52) U.S. Cl.
CPC ......... *B62D 5/0463* (2013.01); *B62D 5/0409* (2013.01); *B62D 5/0481* (2013.01);
(Continued)

(58) Field of Classification Search
CPC ...... B62D 5/0463; B62D 5/04; B62D 5/0409; B62D 5/0481; B62D 6/00; B62D 5/0484;
(Continued)

(56) References Cited

U.S. PATENT DOCUMENTS 9,467,078 B2 * 10/2016 Mukai ....................... H02P 6/12
10,259,491 B2 * 4/2019 Shinkawa ............ B62D 5/0484
(Continued)

FOREIGN PATENT DOCUMENTS

JP    2005-199746 A    7/2005
JP    2008-129669 A    6/2008
(Continued)

OTHER PUBLICATIONS

International Search Report for PCT/JP2017/008227 dated May 9, 2017 [PCT/ISA/210].
(Continued)

*Primary Examiner* — Paula L Schneider
(74) *Attorney, Agent, or Firm* — Sughrue Mion, PLLC

(57) ABSTRACT

A motor control unit that is connected to a motor release switch which includes FETs and is disposed between an inverter and a motor, including: a control section to detect an assist state of the inverter, to turn-ON or turn-OFF a control of the inverter based on a detection result and to detect whether abnormality is existed or not; a motor rotational speed detecting section to detect a motor rotational speed; an energy calculating section to calculate an energy based on the motor rotational speed; a judging section to turn-OFF all of the FETs of the motor release switch when the energy is within an area of safety operation; and a state detecting section to detect whether abnormality is existed or not based on information from an abnormality detecting section that detects abnormality of the sensors and the inverter, wherein the control section turns-ON the control of the inverter when (Continued)

the state detecting section does not detect abnormality and turns-OFF the control of the inverter when the state detecting section detects abnormality.

15 Claims, 15 Drawing Sheets

(51) Int. Cl.
*H02P 6/28* (2016.01)
*H02P 6/08* (2016.01)
*H02P 23/14* (2006.01)

(52) U.S. Cl.
CPC ......... *B62D 5/0484* (2013.01); *B62D 5/0487* (2013.01); *B62D 5/0496* (2013.01); *H02P 6/08* (2013.01); *H02P 6/12* (2013.01); *H02P 6/28* (2016.02); *H02P 23/14* (2013.01)

(58) Field of Classification Search
CPC ....... B62D 5/0487; B62D 5/0496; H02P 6/28; H02P 6/08; H02P 6/12; H02P 23/14
USPC .......................................................... 701/41
See application file for complete search history.

(56) References Cited

U.S. PATENT DOCUMENTS

| | | | | |
|---|---|---|---|---|
| 2011/0074333 A1* | 3/2011 | Suzuki | ................ | B62D 5/0403 318/724 |
| 2014/0077741 A1* | 3/2014 | Kumagai | ................ | H02P 23/00 318/490 |
| 2018/0154931 A1* | 6/2018 | Shinkawa | .............. | B62D 5/046 |

FOREIGN PATENT DOCUMENTS

| | | |
|---|---|---|
| JP | 2008-141868 A | 6/2008 |
| JP | 2011-239489 A | 11/2011 |
| JP | 5120041 B2 | 1/2013 |
| JP | 2013-183462 A | 9/2013 |
| JP | 2015-523048 A | 8/2015 |
| WO | 2015/190192 A | 12/2015 |

OTHER PUBLICATIONS

International Preliminary Report on Patentability for PCT/JP2017/008227 dated Mar. 8, 2018 [PCT/JP/IPEA/409].

* cited by examiner

PRIOR ART

PRIOR ART

PRIOR ART

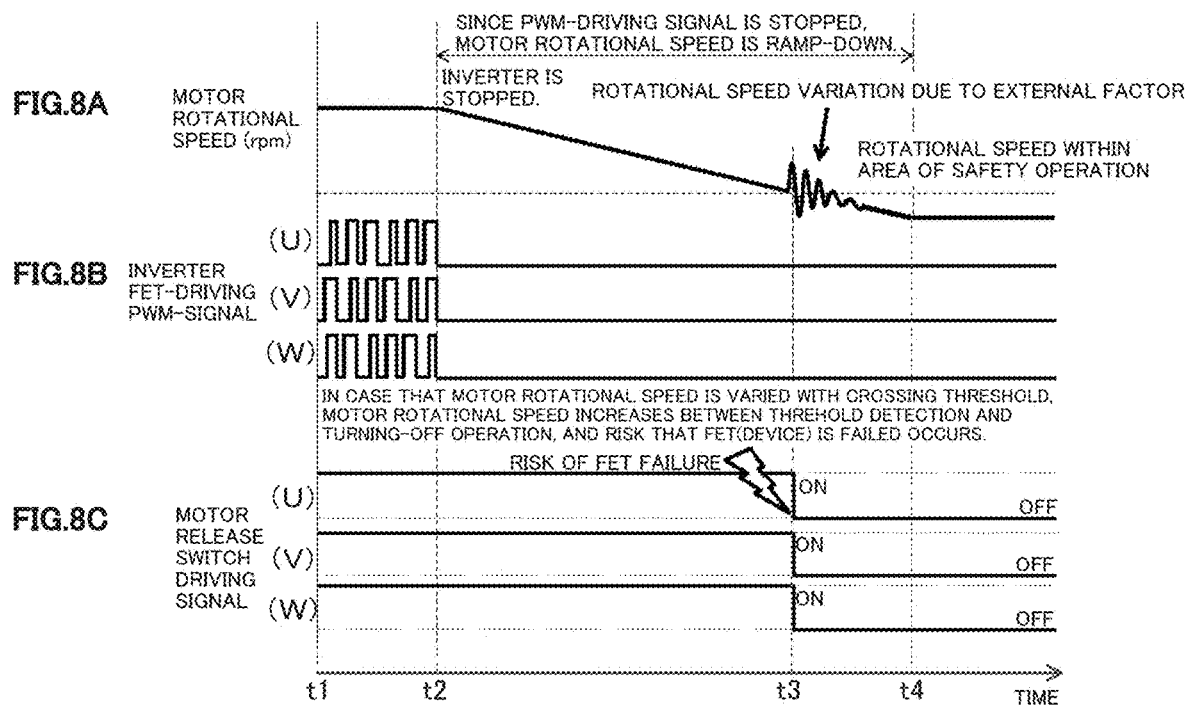
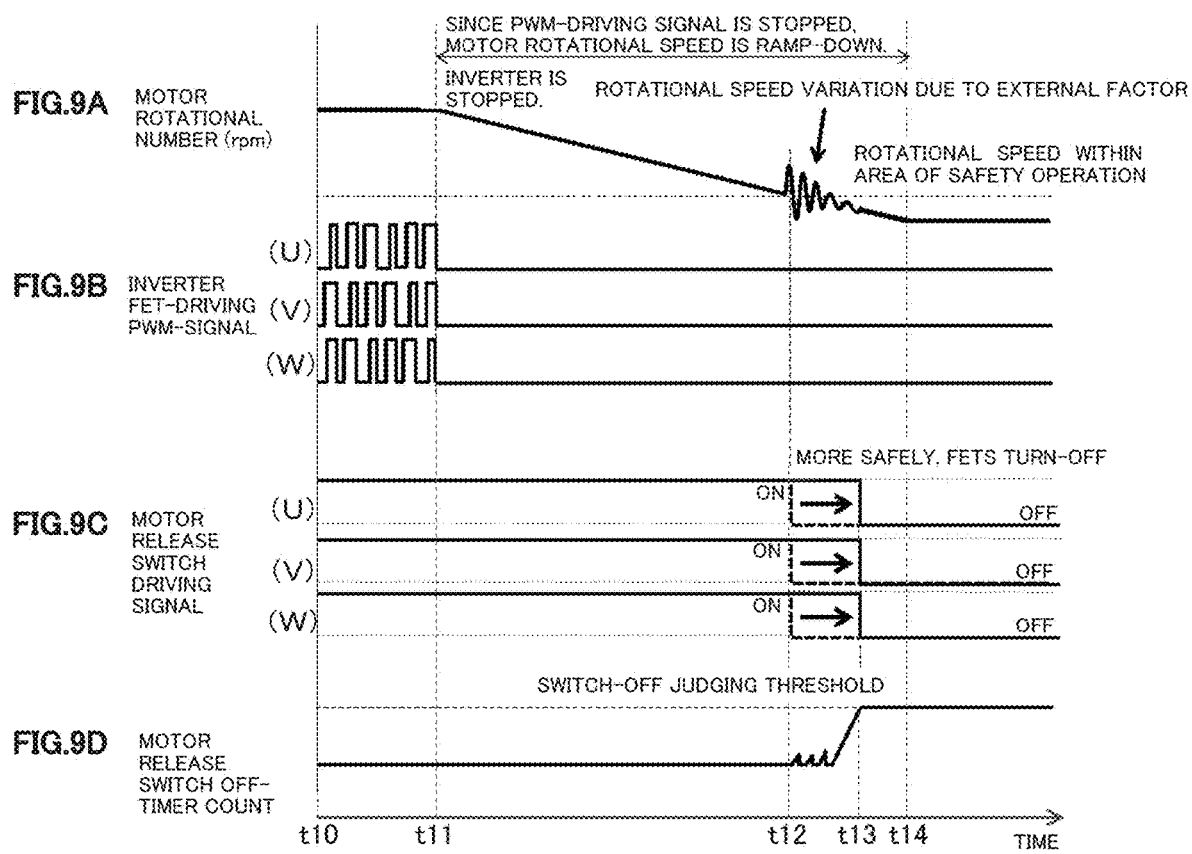

MOTOR CONTROL UNIT AND ELECTRIC POWER STEERING APPARATUS EQUIPPED WITH THE SAME

CROSS REFERENCE TO RELATED APPLICATIONS

This application is a National Stage of International Application No. PCT/JP2017/008227, filed on Mar. 2, 2017, which claims priority from Japanese Patent Application No. 2016-042217, filed on Mar. 4, 2016, Japanese Patent Application No. 2016-042218, filed on Mar. 4, 2016, and Japanese Patent Application No. 2016-042219, filed on Mar. 4, 2016.

TECHNICAL FIELD

The present invention relates to a motor control unit that surely protects semiconductor switching devices (for example, field-effect transistors (FETs)) by turning-OFF a motor release switch, which comprises the semiconductor switching devices connected to an inverter which drives the motor, when a switching loss in blocking the switching devices by generating from the regenerative electric power continues for a predetermined time in a state that a rotational speed is equal to or lower than that of an area of safety operation by using energy (electric power) of regenerative electric power (which is obtained from a motor back-electromotive force voltage (a motor back-EMF) and a regenerative current) and a temperature by a motor rotation when the motor rotates by means of an external force, and an electric power steering apparatus equipped with the above motor control unit.

The electric power steering apparatus applies a steering assist torque to a steering system of a vehicle or a rack shaft by means of the motor by using a current command value that is calculated based on at least a steering torque. The motor is driving-controlled by the inverter that is constituted by a bridge circuit of the semiconductor switching devices.

BACKGROUND ART

The electric power steering apparatus (EPS) is exemplified as an apparatus that is equipped with the motor control unit. The electric power steering apparatus which provides a steering system of a vehicle with a steering assist torque (an assist torque) by a rotational torque of a motor, applies the steering assist torque to a steering shaft or a rack shaft by means of a transmission mechanism such as gears by using a driving force of the motor which is controlled by electric power supplied from an inverter. In order to accurately generate the steering assist torque, such a conventional electric power steering apparatus performs a feed-back control of a motor current. The feed-back control adjusts a voltage supplied to the motor so that a difference between a steering assist command value (a current command value) and a detected motor current value becomes small, and the adjustment of the voltage supplied to the motor is generally performed by an adjustment of duty command values of a pulse width modulation (PWM) control.

A general configuration of the conventional electric power steering apparatus will be described with reference to FIG. 1. As shown in FIG. 1, a column shaft (a steering shaft or a handle shaft) 2 connected to a handle 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a torque sensor 10 for detecting a steering torque Th of the handle 1 and a steering angle sensor 14 for detecting a steering angle θ, and a motor 20 for assisting the steering torque Th of the handle 1 is connected to the column shaft 2 through the reduction gears 3. The electric power is supplied to a control unit (ECU: Electronic Control Unit) 100 for controlling the electric power steering apparatus from a battery 13, and an ignition key signal is inputted into the control unit 100 through an ignition key 11. The control unit 100 calculates a current command value of an assist command (a steering assist command) on the basis of the steering torque Th detected by the torque sensor 10 and a vehicle speed Vs detected by a vehicle speed sensor 12, and controls a current supplied to the motor for the EPS 20 by means of a voltage control command value Vref obtained by performing compensation or the like to the current command value.

A steering angle sensor 14 is not indispensable and may not be provided. It is possible to obtain the steering angle from a rotational position sensor which is connected to the motor 20.

The controller area network (CAN) 40 to send/receive various information and signals on the vehicle is connected to the control unit 100, and it is also possible to receive the vehicle speed Vs from the CAN. Further, a Non-CAN 41 is also possible to connect to the control unit 100, and the Non-CAN 41 sends and receives a communication, analogue/digital signals, electric wave or the like except for the CAN 40.

The control unit 100 mainly comprises a central processing unit (CPU) (including a micro processing unit (MPU) and a micro controller unit (MCU)), and general functions performed by programs within the CPU are, for example, shown in FIG. 2.

The control unit 100 will be described with reference to FIG. 2. As shown in FIG. 2, the steering torque Th detected by the torque sensor 10 and the vehicle speed Vs detected by the vehicle speed sensor 12 (or from the CAN 40) are inputted into a current command value calculating section 101 which calculates the current command value Iref1. The current command value calculating section 101 calculates the current command value Iref1, based on the steering torque Th and the vehicle speed Vs with reference to an assist map or the like, which is a control target value of a current supplied to the motor 20. The calculated current command value Iref1 is inputted into a current limiting section 103 via an adding section 102A, and the current command value Irefm whose maximum current is limited is inputted into a subtracting section 102B. A deviation ΔI (=Irefm−Im) between the current command value Irefm and a motor current value Im which is fed-back is calculated at the subtracting section 102B, and the deviation ΔI is inputted into a proportional-integral-control section (PI-control section) 104 for improving a current characteristic of the steering operation. The voltage control command value Vref that the characteristic is improved at the PI-control section 104, is inputted into a PWM-control section 105, and the motor 20 is PWM-driven through an inverter 106. The current value Im of the motor 20 is detected by a motor current detector 107 and is fed-back to the subtracting section 102B. The inverter 106 is constituted by abridge circuit of FETs as a semiconductor switching device.

The rotational sensor 21 such as the resolver is connected to the motor 20 and a motor rotational angle θ is outputted. Further, a motor velocity ω is calculated at a motor velocity calculating section 22.

A compensation signal CM from a compensation signal generating section 110 is added at the adding section 102A.

A characteristic compensation of the steering system is performed by adding the compensation signal CM, and a convergence, an inertia characteristic, and the like are improved. The compensation signal generating section 110 adds a self-aligning torque (SAT) 113 to an inertia 112 at an adding section 114. The addition result is further added with a convergence 111 at an adding section 115. The addition result at the adding section 115 is processed as the compensation signal CM.

In a case that the motor 20 is a three-phase brushless motor, details of the PWM-control section 105 and the inverter 106 have a configuration as shown in FIG. 3, and the PWM-control section 105 comprises a duty calculating section 105A that calculates the PWM-duty values D1 to D6 which are used in a three-phase PWM-control by using the voltage control command value Vref in accordance with a predetermined equation, and a gate driving section 105B that drives gates of the FETs as the driving device by means of the PWM-duty values D1 to D6 and turns-ON or turns-OFF the gates of the FETs for compensating a dead time. The inverter 106 is constituted by the three-phase bridge of the FETs (FET 1 to FET 6) as the semiconductor switching device, and the motor 20 is driven by turning-ON or turning-OFF the gates of the FETs by means of the PWM-duty values D1 to D6. A motor relay 23 for supplying (ON) the electric power or blocking (OFF) the electric power is connected to respective phases in the electric power supply lines between the inverter 106 and the motor 20.

With reference to such an electric power steering apparatus, unpredictable state at a system-abnormality detection time (for example, disconnection in the torque sensor, a short circuit of the motor control stage-FETs and the like) can be occurred. As a response in the above case, the assist-control of the electric power steering apparatus is immediately stopped, and a connection between the driving control system and the motor is blocked with the highest priority.

Generally, as shown in FIG. 3, the motor relay is interposed between the motor 20 and the inverter 106 that controls a current which is passed through the motor 20. A non-expensive contact relay is used to the motor relay 23, and the current which is passed through the current is blocked by electromagnetically releasing the contact point by means of the hardware (for example, Japanese Unexamined Patent Publication No. 2005-199746 A (Patent Document 1)).

However, recently, in order to miniaturize the apparatus, improve a reliability and decrease costs, the contact electromagnetic motor relay replaces with the contactless motor release switch that comprises, for example, the FETs (analog switch). However, when it is impossible to continue the assist control by the system abnormality, in a case that the motor is rotating even when the inverter is stopped, the motor release switch is turned-OFF in rotating the motor, the regenerative electric power of the motor deviates from the area of safety operation, and then the motor release switch is damaged and is destroyed. This problem is also occurred when the voltage is recovered and the switch is turned-ON again after the MCU is reset and the motor release switch is turned-OFF.

For example, Japanese Unexamined Patent Publication No. 2013-183462 A (Patent Document 2) discloses the apparatus that uses the semiconductor switching device as the motor relay. In the apparatus of Patent Document 2, when a failure of the electric power converter (the inverter) is detected, the driving of the inverter is stopped, and a first power supply relay and a second power supply relay are turned-OFF. In a state that the driving of the inverter is stopped, when the motor rotates by the external force and the regenerative voltage is generated, the regenerative voltage is regenerated from the inverter to the power supply (the battery) through parasitic diodes of the first power supply relay and the second power supply relay that are an ON-state.

In the electric power steering apparatus, we especially pay attention that the device is destroyed by the deviation from the area of safety operation of the semiconductor device by generating the motor back-EMF by means of the rotation of the motor and the switching loss when the motor relay is turned-OFF by the motor regenerative current. It is strongly desired that a countermeasure of the destruction in an on-vehicle device is non-expensively and surely performed without adding the hardware components as much as possible.

Further, in Japanese Patent No. 5120041 (Patent Document 3), in a case that all of phase release means (the motor relay) is opened, and the voltage in the one particular phase is applied, when the terminal voltage based on the applying of the voltage in the phase that is not the above particular phase is detected, it is judged that the short circuit is occurred in the phase release means in the above particular phase. Thus, the apparatus of the Patent Document 3 is detected for the failure of the phase release means itself, and does not protect the semiconductor switching device.

THE LIST OF PRIOR ART DOCUMENTS

Patent Documents

Patent Document 1: Japanese Unexamined Patent Publication No. 2005-199746 A
Patent Document 2: Japanese Unexamined Patent Publication No. 2013-183462 A
Patent Document 3: Japanese Patent No. 5120041 B2
Patent Document 4: Japanese Unexamined Patent Publication No. 2011-239489 A
Patent Document 5: Japanese Unexamined Patent Publication No. 2008-141868 A

SUMMARY OF THE INVENTION

Problems to be Solved by the Invention

The apparatuses in Japanese Unexamined Patent Publication No. 2011-239489 A (Patent Document 4) and Japanese Unexamined Patent Publication No. 2008-141868 A (Patent Document 5) disclosed as the motor device that protects the semiconductor switching device are proposed. In the Patent Document 4, the switching device is protected by performing the OFF-process of the PWM-control from the circuit abnormality detecting for a determined time (a time of discharging the avalanche energy). In the Patent Document 5, for the OFF-process from the abnormality detecting, when the motor rotational speed and the motor temperature in the circuit blocking condition is a low temperature side, the threshold is relatively set to the high-speed rotation side.

However, in the apparatus of the Patent Document 4, after turning-OFF each of the semiconductor switching devices of the inverter, when the predetermined time is elapsed, since the semiconductor devices of the motor release switch are turned-OFF without considering the area of safety operation, there is a problem in the certainty of the device protection. In the motor system of the Patent Document 5, by continuing the driving control of the AC (Alternating Current) motor by means of weak field control in the high speed rotational state, it is prevented that the excessive motor back-EMF that is induced in the motor is applied to the inverter, and the equipment is damaged. However, the Patent Document 5 does not disclose in protecting the semiconductor switching devices of the motor release switch and does not describe in turning-ON the semiconductor switching devices again.

In any apparatus, it is not judged the abnormal (including the failure) mode. Since the apparatus does not perform the dealing to the different regenerative current depending on the abnormal mode, there is a problem that an optimal control cannot be performed.

The present invention has been developed in view of the above-described circumstances, and an object of the present invention is to provide the motor control unit that surely and high-reliably performs the protection of the motor release switch that compactly comprises the semiconductor switching devices, depending on the abnormal mode and relevant to the temperature, without adding the device components, and the electric power steering apparatus equipped with the motor control unit. The object of the present invention is also to provide the motor control unit that surely and high-reliably performs the protection when the semiconductor switching devices are turned-ON again.

Means for Solving the Problems

The present invention relates to a motor control unit that driving-controls a motor by an inverter based on a current command value calculated with a steering torque from a torque sensor, and is connected to a motor release switch which comprises field-effect transistors (FETs) and is disposed between the inverter and the motor, the above-described object of the present invention is achieved by that comprising: a control section to detect states of sensors including the torque sensor and an assist state of the inverter, to turn-ON or turn-OFF control of the inverter based on a detection result and to detect whether an abnormality is existed or not; a motor rotational speed detecting section to detect a motor rotational speed of the motor; an energy calculating section to select a motor back-electromotive force voltage (a motor back-EMF) and regenerative currents by using a data table based on the motor rotational speed and to calculate an energy by using data thereof; a judging section to turn-OFF all of the FETs of the motor release switch when the energy is compared with an area of safety operation of the FETs and the energy is within the area of safety operation; and a state detecting section to detect whether an abnormality is existed or not based on information from an abnormality detecting section that detects an abnormality of the sensors and the inverter; wherein the control section turns-ON the control of the inverter when the state detecting section does not detect the abnormality and turns-OFF the control of the inverter when the state detecting section detects the abnormality.

Further, the present invention relates to a motor control unit that driving-controls a motor by an inverter which comprises first field-effect transistors (FETs) based on a current command value calculated by using at least a steering torque from a torque sensor, and is connected to a motor release switch which comprises second FETs and is disposed between the inverter and the motor, the above-described object of the present invention is achieved by that comprising: a control section to detect states of sensors including the torque sensor and an assist state of the inverter, to turn-ON or turn-OFF a control of the inverter based on a detecting result and to detect whether an abnormality is existed or not; a motor rotational speed detecting section to detect a motor rotational speed of the motor; an energy calculating section to calculate a motor back-electromotive force voltage (a motor back-EMF) and an energy of regenerative currents by means of a data table based on the motor rotational speed; a judging section to turn-OFF all of the second FETs when the energy is compared with an area of safety operation of the second FETs and the energy is within the area of safety operation; and a state detecting section to detect an abnormality mode based on information from an abnormality detecting section that detects an abnormality of the sensors and the inverter; wherein the control section turns-ON the control of the inverter when the state detecting section does not detect the abnormality, turns-OFF the control of the inverter when the state detecting section detects the abnormality, selects a current in the regenerative currents depending on the abnormality mode detected at the state detecting section, and calculates the energy based on a selected regenerative current.

The present invention relates to the motor control unit, the above-described object of the present invention is efficiently achieved by that: wherein the regenerative current to calculate the energy is selected from the plural regenerative currents depending on an abnormality mode detected at the state detecting section, for example, in the judging section, in a case that abnormality detected at the state detecting section is considered to a short circuit failure of the inverter, a large current is selected as the regenerative current, and in a case of abnormality other than an above case, a smaller current is selected as the regenerative current, wherein the more accurate energy is calculated by a selected regenerative current depending on the abnormality mode.

Furthermore, the present invention relates to a motor control unit that driving-controls a motor by an inverter which comprises first field-effect transistors (FETs) based on a current command value calculated by using at least a steering torque from a torque sensor, and is connected to a motor release switch which comprises second FETs and is disposed between the inverter and the motor, the above-described object of the present invention is achieved by that comprising: a control section including a micro controller unit (MCU) to detect states of sensors including the torque sensor and an assist state of the inverter, to turn-ON or turn-OFF a control of the inverter based on a detection result and to detect whether an abnormality is existed or not; a motor rotational speed detecting section to detect a motor rotational speed of the motor; an energy calculating section to calculate a motor back-electromotive force voltage (a motor back-EMF) and a regenerative current energy by means of a data table based on the motor rotational speed; an energy calculating section to select a motor back-EMF and a regenerative current by means of a data table based on the motor rotational speed and to calculate an energy by using data thereof; a judging section to turn-OFF all of the second FETs when the energy is compared with an area of safety operation of the second FETs and the energy is within the area of safety operation; a state detecting section to detect whether abnormality is existed or not based on information from an abnormality detecting section that detects the abnormality of the sensors and the inverter; a temperature detecting section to detect a temperature of the first FETs or a temperature around the first FETs; and a recording device to record at least the temperature detected at the temperature detecting section, an abnormality detection at the state detecting section, and date and time information that the MCU is reset; wherein the control section turns-ON the control of the inverter when the state detecting section does not detect the abnormality and turns-OFF the control of the inverter when the state detecting section detects the abnormality.

Effects of the Invention

In accordance with the motor control unit (the first embodiment) according to the present invention, in a case that a motor rotational speed is high (the motor back-EMF and the energy of the regenerative current (regenerative electric power) are out of the area of safety operation), the motor control unit continues a turning-ON of the motor release switch and performs a control that the regenerative current is returned to the power supply, a brake torque is applies to the rotating motor, and the motor rotational speed gradually decreases due to the brake torque. Then, the motor control unit measures the elapsed time not just after the motor back-EMF and the energy of the regenerative current (the regenerative electric power) are within the area of safety operation, but after the above energy is surely within the area of safety operation, and turns-OFF all of the semiconductor switching devices (FETs) of the motor release switch when the above state continuously elapsed for a predetermined time.

In accordance with the second embodiment, the motor control unit continues the turning-ON of the motor release switch and performs a control that the regenerative current is returned to the power supply and a parameter (a regenerative current amount) to use for the calculation is changed depending on the abnormal mode. Thereby, the motor rotational speed gradually decreases, the motor control unit is able to calculate more accurate regenerative energy and turns-OFF the motor release switch after the above energy is surely within the area of safety operation.

Further, in accordance with the third embodiment, after turning-OFF the motor release switch by means of the above embodiments or by means of resetting the MCU, in a case that the abnormality such as the failure is not detected, and it is judged that the motor control unit is normal, monitoring the temperature information of a temperature detecting device on the power substrate, the motor rotational speed and the elapsed time after turning-OFF the motor release switch, when the switching loss in turning-ON the semiconductor switching devices, which is generated by the regenerative electric power which is calculated from the motor back-EMF and the regenerative current, becomes the motor rotational speed that is within the area of safety operation, the semiconductor switching devices are turned-ON again.

Consequently, in accordance with the present invention, without adding a new device component and adding a new protection circuit, by using a non-expensive configuration, the motor release switch that comprises the semiconductor switching devices can surely be protected.

Since the temperature of the motor release switch that is a protection object or the temperature around the motor release switch is considered in calculating of the area of safety operation.

In accordance with the electric power steering apparatus equipped with the motor control unit according to the present invention, the protection of the semiconductor switching devices of the motor release switch interposed between the motor and the inverter can surely and easily be achieved, and the safety and the reliability of steering can be further improved.

BRIEF DESCRIPTION OF THE DRAWINGS

In the accompanying drawings:

FIGS. 8A to 8C are a timing chart showing an example of a relay failure due to varying the motor rotational speed;

FIG. 9A to 9D are a timing chart showing an operation example of the present invention against varying the motor rotational speed;

MODE FOR CARRYING OUT THE INVENTION

Figure 1:
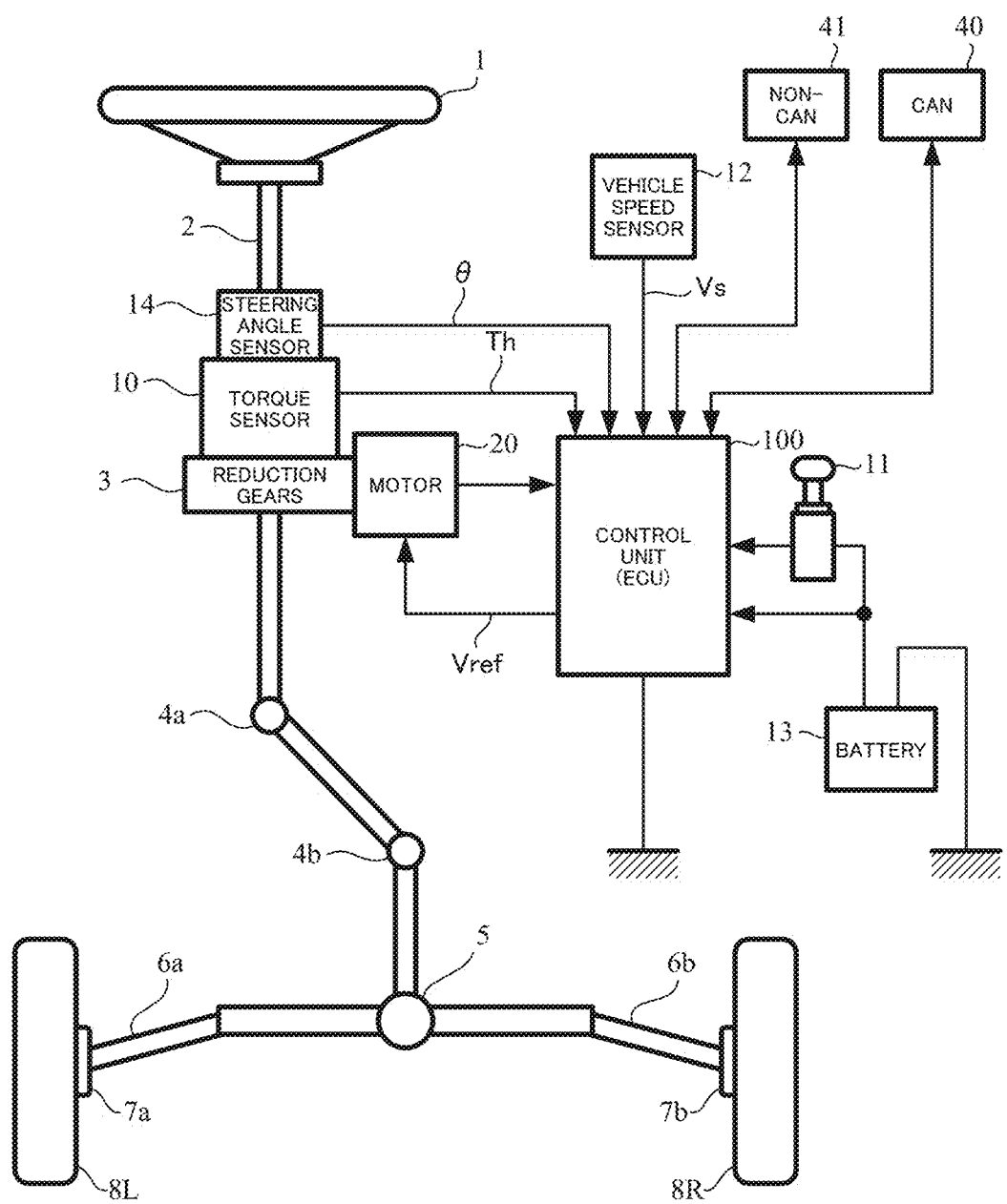
FIG. 1 is a configuration diagram showing a general outline of an electric power steering apparatus.
Figure 2:
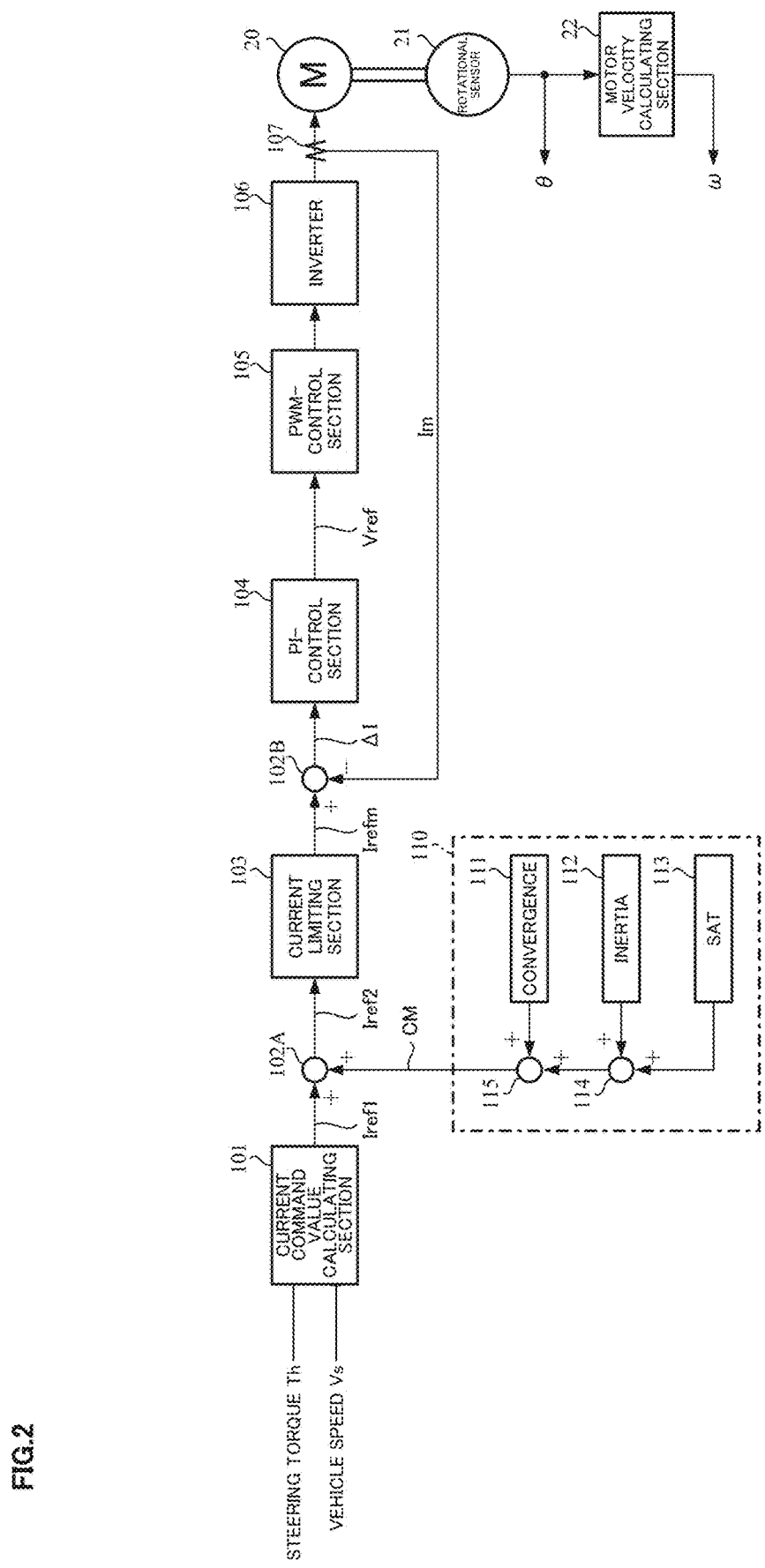
FIG. 2 is a block diagram showing a general configuration example of a control unit (ECU) of the electric power steering apparatus.

In the present invention, in order to achieve a miniaturization of a motor release switch (a motor relay), improve a reliability and decrease costs, the motor release switch comprises semiconductor switching devices (for example, field-effect transistors (FETs)). When it is impossible to continue an assist control by occurring an abnormality (including a failure) of sensors such as a torque sensor, an inverter, or the like (including a case that an ignition key is turned-OFF in rotating a motor), in order to protect a device destruction of the motor release switch by a motor regenerative electric power (which is calculated from a motor back-electromotive force voltage (a motor back-EMF) and a regenerative current) that is generated in rotating the motor due to external force, a motor control unit of the present invention calculates the energy of the motor back-EMF and the regenerative current based on a data table and the like from a motor rotational speed. Then, the motor control unit calculates an area of safety operation of the motor release switch based on a temperature of the motor release switch or the temperature around the motor release switch, and performs a control that the turning-ON of the motor release switch is continued and the regenerative current is returned to a power supply in a case that the motor rotational speed is high (that is, the energy of the motor back-EMF and the regenerative current is out of the area of safety operation). A braking force is applied to the rotating motor by returning the regenerative current to the power supply, and then the motor rotational speed gradually decreases. The motor control unit of the present invention turns-OFF all of the semiconductor switches of the motor release switch when a predetermined time is elapsed after the energy of the motor back-EMF and the regenerative current is within the area of safety operation. Thereafter, the motor control unit performs a required process to stop the assist control.

In a second embodiment of the present invention, especially, by focusing that the regenerative current is different depending on the abnormal mode, and changing the current in calculating the regenerative electric power depending on the abnormal mode, the motor control unit calculates the regenerative electric power more accurately and protects the semiconductor switching devices safely by turning-OFF the semiconductor switching devices at an optimal time. When an abnormality, such that a short circuit failure of a motor control stage-FET is doubted, is detected, the regenerative current that is used in calculation is set to higher. For example, in a case that the short circuit failure is occurred in the low-side FET of the motor control-stage, since the motor back-EMF that is generated between the motor terminals is in a ground fault through the FET in which the short circuit failure is occurred, the regenerative current increases. Further, in a case that the abnormality other than the short circuit failure of the motor control stage-FET is detected (disconnection of a sensor or the like) the regenerative current that is used in calculation is set to lower. In this way since the regenerative current is different depending on the abnormal mode, a judging section judges the abnormal mode, and changes a parameter that is used in calculation (the regenerative current amount) depending on the abnormal mode. Therefore it is possible to calculate the regenerative electric power more accurately and to turn-OFF the FETs corresponding to the motor relay at a safer timing.

A third embodiment of the present invention safely and surely protects the semiconductor devices from the regenerative electric power that is generated by the rotation of the motor (the energy due to the motor back-EMF and the regenerative current) when the semiconductor switching devices (FETs) of the motor release switch that are used in an electric power steering apparatus (EPS) and the like recover from a forcibly turning-OFF state by resetting the MCU or the like, and turn-ON again. In the third embodiment, after all of the semiconductor switching devices of the motor release switch are turned-OFF or the semiconductor switching devices of the motor release switch are turned-OFF by resetting the MCU, in a case that the abnormality such as the failure is not detected, the semiconductor switching devices of the motor release switch are judged in a normal state and are turned-ON again, the energy (the regenerative electric power) is compared with the area of safety operation. Then, when the energy is out of the area of safety operation and it is judged that the device destruction can be occurred, the semiconductor switching devices of the motor release switch are held in the turning-OFF, and when the energy is within the area of safety operation and it is judged that the device destruction cannot be occurred, the semiconductor switching devices of the motor release switch are turned-ON again.

Monitoring the temperature information and the motor rotational speed, after the switching loss at a FET-blocking time generated by the regenerative electric power being calculated from the motor back-EMF and the regenerative current, is the motor rotational speed that is within the area of safety operation, when the time that is within the area of safety operation is continuously elapsed for the predetermined time, all of the semiconductor switching devices of the motor release switch are turned-OFF. Or, also when the motor control unit recovers after the above turning-OFF or resetting the MCU due to a reason other than occurring the abnormality, after the energy is within the area of safety operation and it is judged that the switching devices cannot be destroyed, all of the semiconductor switching devices are turned-ON again. Thus, the damage and the destruction of the semiconductor switching devices by means of the deviation of the area of safety operation are not occurred when the semiconductor switching devices are turned-OFF and turned-ON, the semiconductor switching devices are surely protected, the high-reliable motor control unit and the electric power steering apparatus are provided.

Figure 4:
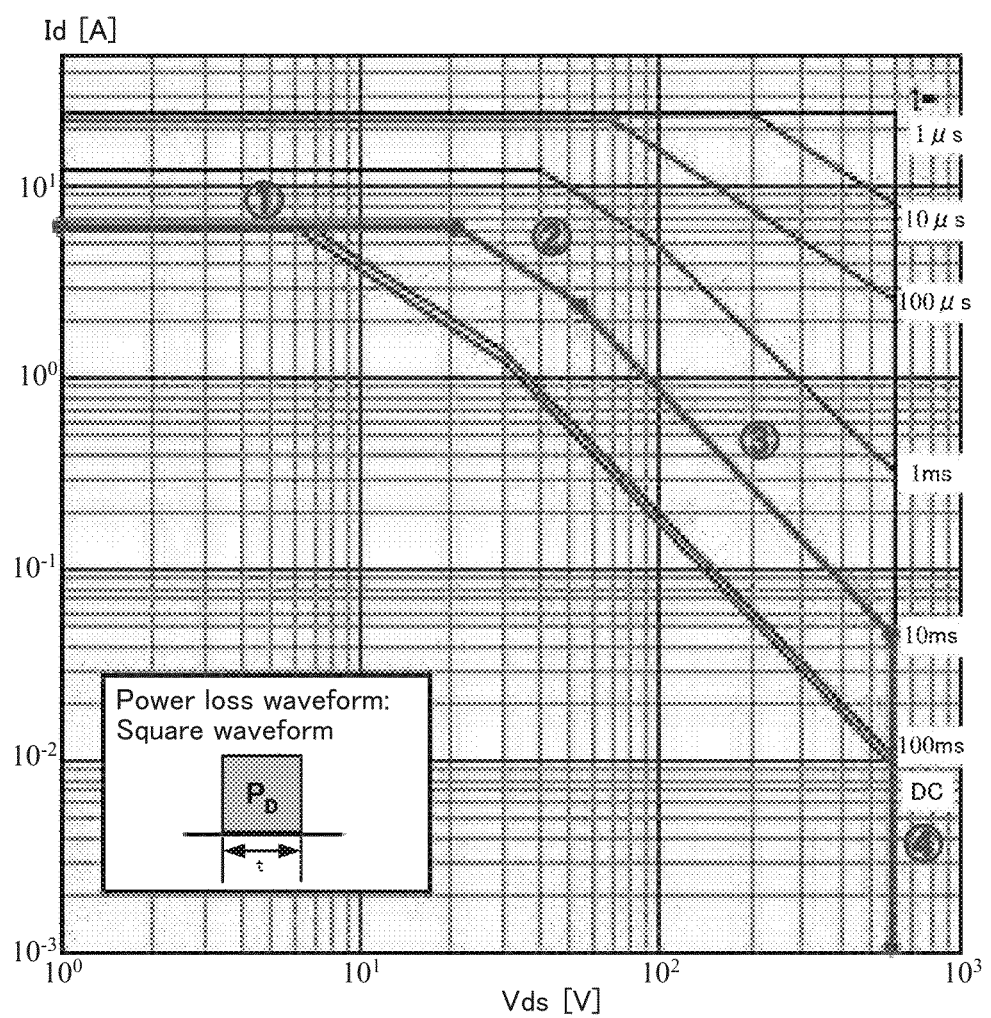
FIG. 4 is a characteristic diagram showing a characteristic example between a voltage Vds between a drain and a source of a field-effect transistor (an FET) and a drain current Id.
Figure 5:
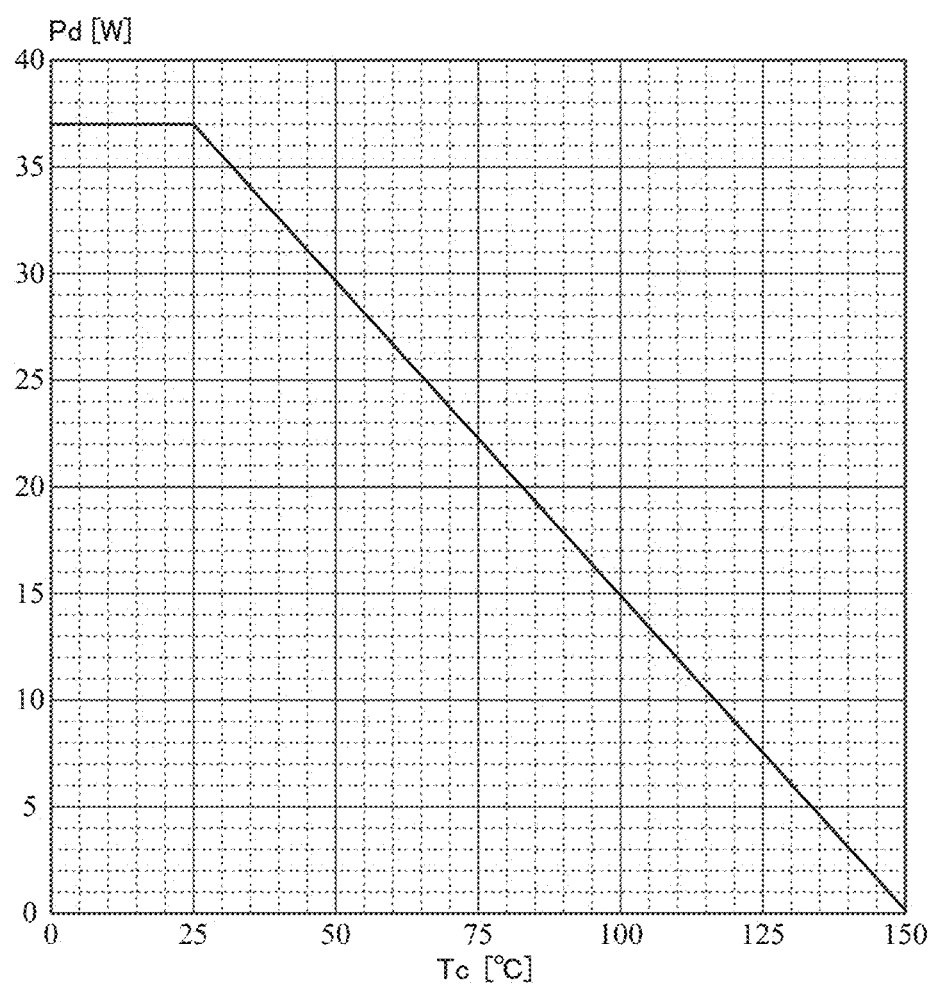
FIG. 5 is a characteristic diagram showing an example of a temperature characteristic of a permissible loss of the FET.

Generally, the area of safety operation (AOS) of the FETs during an operation is determined by the relationship between a drain current Id and a voltage Vds between the drain and a source as shown in FIG. 4 and the temperature characteristic of the maximum permissible loss Pd as shown in FIG. 5. However, this area of safety operation is varied by the operating conditions (such as an FET-case temperature Tc, an operation frequency f, and an ON-width t) actually used. Especially, since the maximum permissible loss Pd decreases when the case temperature increases, it is important to determine the accurate area of safety operation. If the temperature is measured by means of a temperature detecting device on the power substrate, the case temperature Tc of the FETs is estimated and the maximum permissible loss Pd that is considered to the temperature can be calculated.

Therefore, in the present invention, since the judging condition includes not only the judgement by means of the motor rotational speed (the regenerative electric power), but also the consideration of the temperature information of the semiconductor switching devices (FETs) on the power substrate or the temperature information around the semiconductor switching devices, and further the consideration of the date and time information (a time stamp), and the accurate area of safety operation is judged, the semiconductor switching devices (FETs) can more safely and surely turn-OFF and turn-ON than using only the judgement by means of the motor rotational speed.

As well, the motor is free run in an emergent assist-OFF. The factors of the assist-OFF are the abnormality of the inverter, the turning-OFF of the ignition key, the abnormality detecting of the software or the hardware, the abnormality of the sensors and the like.

Embodiments according to the present invention will be described with reference to the drawings in detail.

Figure 3:
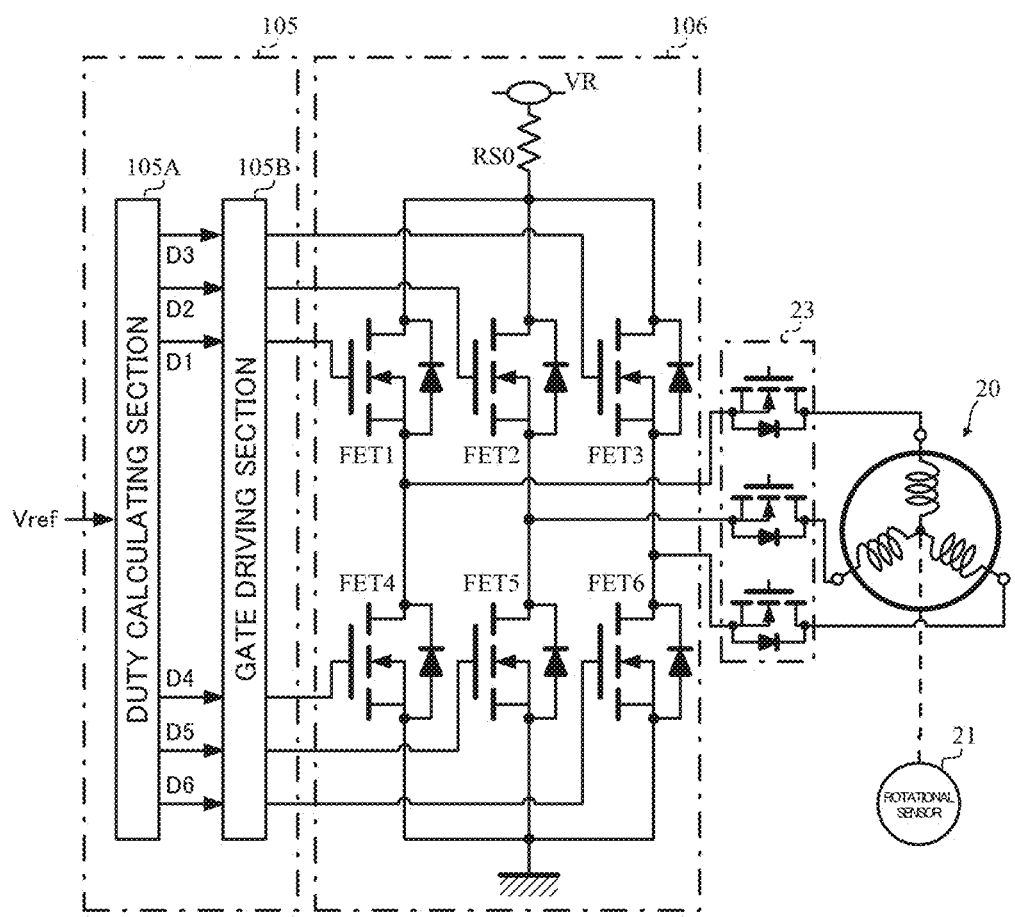
FIG. 3 is a circuit diagram showing a configuration example of a motor control section of the electric power steering apparatus.
Figure 6:
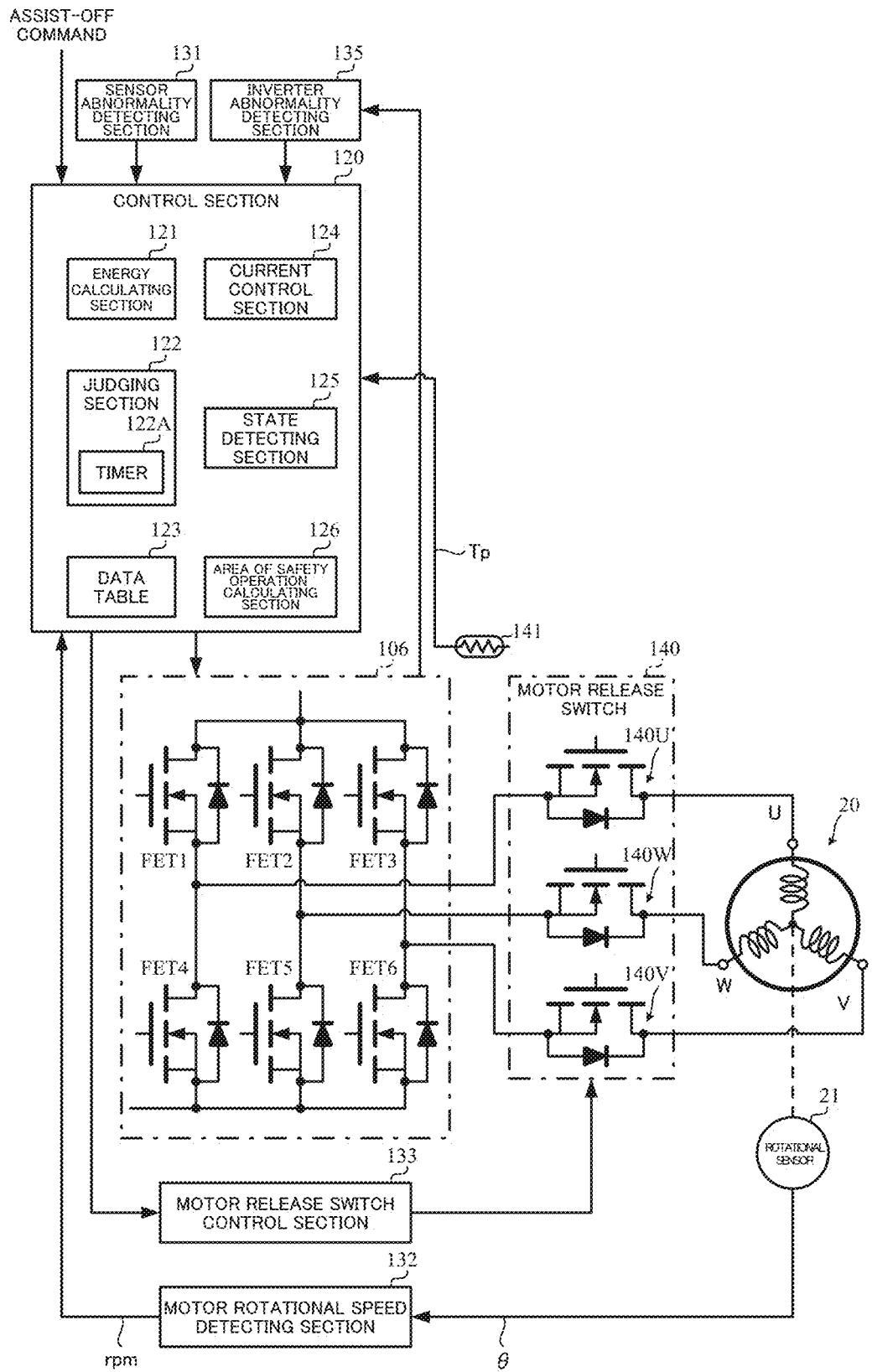
FIG. 6 is a block diagram showing a configuration example of the present invention (the first embodiment)
Figure 7:
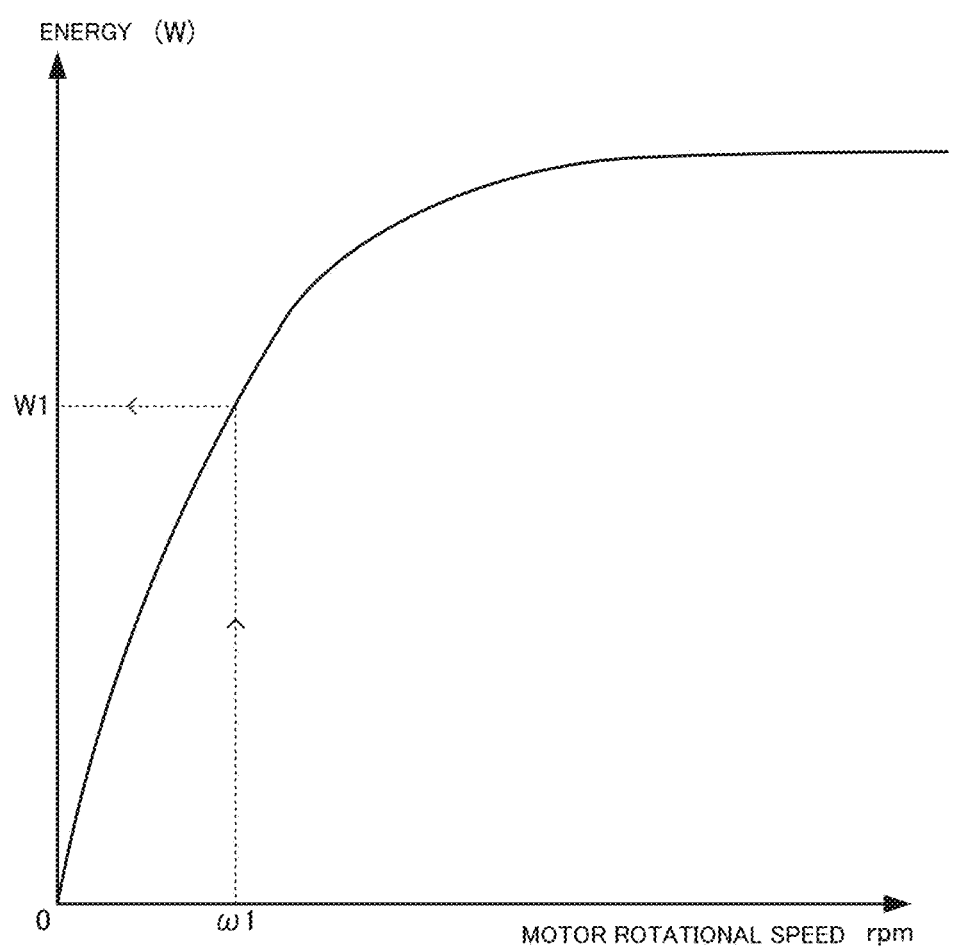
FIG. 7 is a characteristic diagram showing a characteristic example of a data table.

FIG. 6 shows a configuration example (the first embodiment) of the present invention corresponding to FIG. 3. In the present invention, a control section 120 comprises an energy calculating section 121, a judging section 122, a data table 123, a current control section 124, a state detecting section 125 and an area of safety operation calculating section 126. The judging section 122 includes a timer 122A, and as described below, the judging section 122 measures an elapsed time and outputs an FET-OFF signal that turns-OFF all of FETU to FETW of the motor release switch 140 when a predetermined time is elapsed. The data table 123 stores the energy W corresponding to the motor rotational speed rpm, that is, the energy W of the motor back-EMF and the regenerative current against the motor rotational speed rpm which are in advance calculated. For example, a relationship between the motor rotational speed rpm and the energy W has a characteristic as shown in FIG. 7. Therefore, by detecting the motor rotational speed rpm, the energy W of the motor back-EMF and the regenerative current can be calculated. In FIG. 7, for example, when the motor rotational speed rpm is ω1, the energy W is calculated as W1.

As well, the data may be stored in a non-volatile memory such as an electrically erasable programmable read-only memory (EEPROM) as the data table 123.

Further, there are provided a sensor abnormality detecting section 131 to detect the abnormality (including the failure) of the sensors such as the torque sensor, an inverter abnormality detecting section 135 to detect the abnormality (including the failure) of the inverter 106, and the state detecting section 125 to detect the abnormality and other states based on the sensor abnormality detecting section 131, the inverter abnormality detecting section 135 and the like, and perform a required process. The state detecting section 125 inputs the assist-OFF command, and detects all of the assist-OFF operation. For example, the state detecting section 125 also detects the state that the ignition key is turned-OFF in rotating the motor.

Furthermore, the motor release switch 140 (140U, 140V and 140W) is interposed in electric power supply lines (U-phase, V-phase and W-phase) between the inverter 106 that is controlled by the current control section 124 in the control section 120 and the motor 20. The motor release switch 140 is turned-ON or turned-OFF by a motor release switch control section 133 that is controlled by the control section 120. A thermistor 141 is disposed as a temperature sensor of a temperature detecting section for detecting the temperature of the motor release switch 140 (140U, 140V and 140W) or the temperature around the motor release switch 140 (140U, 140V and 140W), and the temperature information Tp being electrically detected is inputted into the control section 120. The thermistor 141 may be disposed on the power substrate that the motor release switch 140 (140U, 140V and 140W) is mounted. The FET1 to FET6 of the inverter 106 and the FETs (140U to 140W) of the motor release switch 140 are mounted on the same substrate.

The area of safety operation calculating section 126 calculates the area of safety operation based on the temperature information Tp from the thermistor 141. The calculated area of safety operation is inputted into the judging section 122.

Further, a motor rotational speed detecting section 132 to detect the motor rotational speed rpm based on a rotational angle θ from the rotational sensor 21 is provided.

When the FETs of the motor release switch 140 are turned-OFF just after the energy of the motor back-EMF and the regenerative current is within the area of safety operation, in a case that the motor rotational speed rpm increases again, the devices can be destroyed. Timing charts of FIGS. 8A to 8C are shown in the above case, and the inverter is stopped at a time point t2 as shown in FIG. 8A and then the motor rotational speed rpm is ramp-down. When the motor rotational speed rpm decreases to a threshold at a time point t3 and the driving signal of the motor release switch 140 turns-OFF as shown in FIG. 8C, the motor rotational speed rpm can be varied by means of the external factor as shown in FIG. 8A. In the electric power steering apparatus, it is estimated that the handle is steered by a force that tires of the steered wheels receive by means of the road condition. As an example, it is considered that the tires of the steered wheels are contact with a road shoulder at a time of turning-OFF the driving signal of the motor release switch 140. As the above case, when the motor rotational speed rpm increases again, the risk that the FETs are destroyed occurs.

In this connection, in the present invention, as shown in FIGS. 9A to 9D, after the inverter is stopped (a time point t11) and a time point t12 when the motor rotational speed rpm is ramp-down and decreases to the threshold, at a time point t13 when the predetermined time is elapsed, the driving signal of the motor release switch 140 turns-OFF. As shown in FIG. 9D, when the count value of the timer count is equal to the threshold, the driving signal turns-OFF. Thereby, it is possible to turn-OFF the FETs of the motor release switch 140 more safely.

Figure 10:
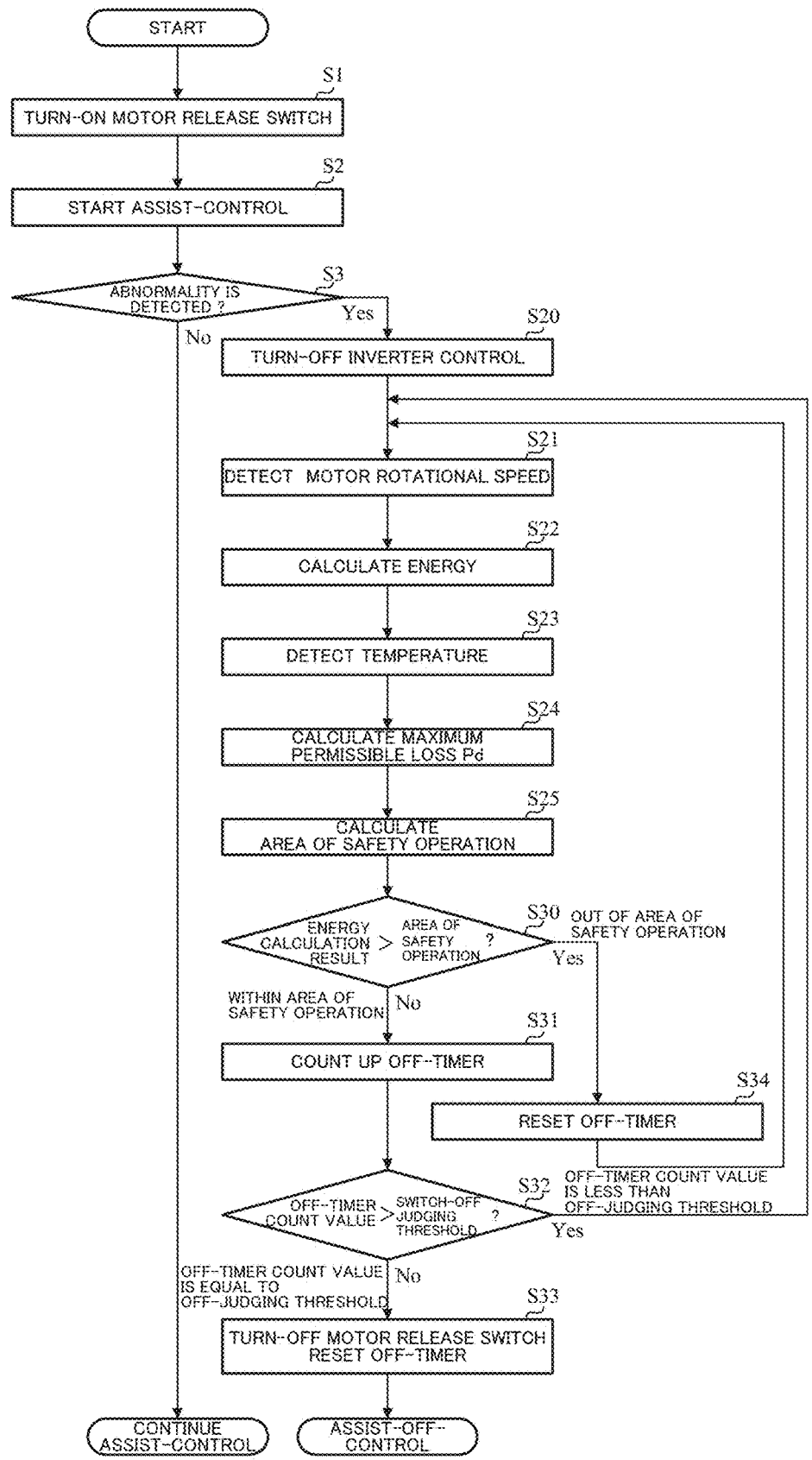
FIG. 10 is a flowchart showing an operation example of the present invention (the first embodiment)

In such a configuration, the operation example will be described with reference to the flowchart of FIG. 10.

When the control operation is started, at first, the motor release switch 140 (140U, 140V and 140W) is turned-ON by means of the motor release switch control section 133 via the control section 120 (Step S1), the control of the inverter 106 turns-ON by the current control section 124 in the control section 120, and then the assist-control is started (Step S2). The state detecting section 125 judges whether the abnormality (including the failure) is detected at the sensor abnormality section 131 and the inverter abnormality section 135 or not (Step S3). In a case that the abnormality is not detected, the assist-control is continued.

In a case that the abnormality is detected at the above Step S3, the motor control unit judges that the continuation of the assist-control is impossible, and the control of the inverter 106 is turned-OFF by the control section 120 (Step S20). When the control of the inverter 106 is turned-OFF, the motor rotational speed detecting section 132 detects the motor rotational speed rpm of the motor 20 that is rotated by the external force (Step S21). The energy calculating section 121 in the control section 120 calculates the energy W of the motor back-EMF E and the regenerative current by using the data table 123 based on the motor rotational speed rpm (Step S22). The motor back-EMF E is calculated in accordance with the following Equation 1, and is stored the data table 123 by using data in advance measured as well as measuring of the regenerative current.

$$E = k \cdot (\text{motor rotational speed per unit time}) \qquad \text{(Equation 1)}$$

Here, k is a motor constant that is determined by a magnetic flux density and a diameter of a rotor of the motor 20, and the like.

The temperature Tp of the motor release switch 140 (or the temperature around the motor release switch 140) is detected by the thermistor 141 (Step S23), and further the maximum permissible loss Pd is calculated (Step S24). The temperature Tp and the maximum permissible loss Pd are inputted into the control section 120. The area of safety operation calculating section 126 in the control section 120 calculates the area of safety operation of the motor release switch 140 based on the temperature Tp and the maximum permissible loss Pd (Step S25).

The calculated area of safety operation is inputted into the judging section 122, the judging section 122 judges whether the calculated energy W is out of the area of safety operation of the FETs that constitutes the motor release switch 140 or not (Step S30). That is, the judging section 122 judges whether "the energy calculation result>the area of safety operation" is satisfied or not. In a case that the calculated energy W is out of the calculated area of safety operation, that is, in a case that the motor rotational speed rpm is high, the calculated energy W is within the range having the risk that the regenerative electric power causes the FET destruction. In a case that the switching loss due to the regenerative current is out of the area of safety operation, the OFF-timer is reset and the turning-ON operation of the motor release switch 140 is continued. Thereby, the control that the regenerative current is returned to the power supply is performed, and the brake torque is applied to the rotating motor.

The motor rotational speed rpm gradually decreases due to the brake torque. After the area of safety block of the motor release switch 140, that is, the energy W is within the area that the switching loss due to the regenerative current is within the area of safety operation, the OFF-timer is counted-up (Step S31), the judging section 122 judges whether the counted value of the OFF-timer is equal to or more than the turning-OFF judging threshold or not (Step S32). When the counted value of the OFF-timer is equal to or more than the turning-OFF judging threshold, the motor release switch 140 turns-OFF and the OFF-timer is reset (Step S33). When the counted value of the OFF-timer is less than the turning-OFF judging threshold, the process is returned to the above Step S21 and the above operation is iterated.

Thereby, without destroying the FETs that constitutes the motor release switch 140, the process that needs to stop the assist-control is performed after the motor release switch 140 turns-OFF.

Next, the configuration of the second embodiment according to the present invention will be described with reference to FIG. 11.

Figure 11:
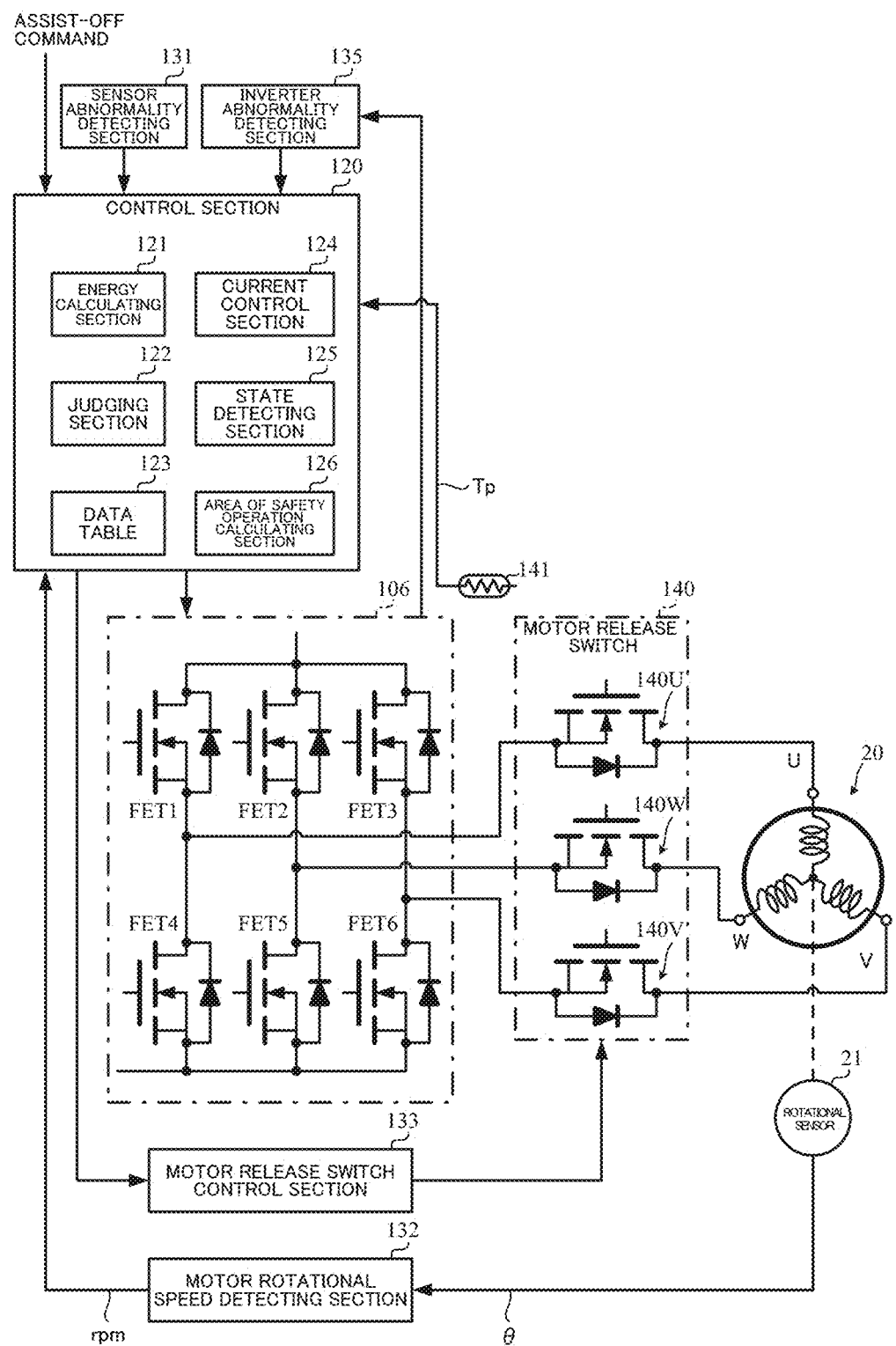
FIG. 11 is a block diagram showing the configuration example of the present invention (the second embodiment)

FIG. 11 is corresponding to FIG. 6, and in the present embodiment, the control section 120 comprises the energy calculating section 121, the judging section 122, the data table 123, the current control section 124, the state detecting section 125 and the area of safety operation calculating section 126. For example, the data table 123 in the non-volatile memory stores the energy W corresponding to the motor rotational speed rpm, which is in advance calculated. The data table 123, for example, has a characteristic as shown in FIG. 7.

The sensor abnormality detecting section 131, the inverter abnormality detecting section 135 and the state detecting section 125 that are explained in FIG. 6, are further provided. The motor release switch 140 is interposed in the electric power supply lines between the inverter 106 that is controlled by the current control section 124 in the control section 120 and the motor 20. The motor release switch 140 is turned-ON or turned-OFF by a motor release switch control section 133. The temperature information Tp that is the temperature of the motor release switch 140 or the temperature around the motor release switch 140 is inputted into the control section 120.

Figure 12:
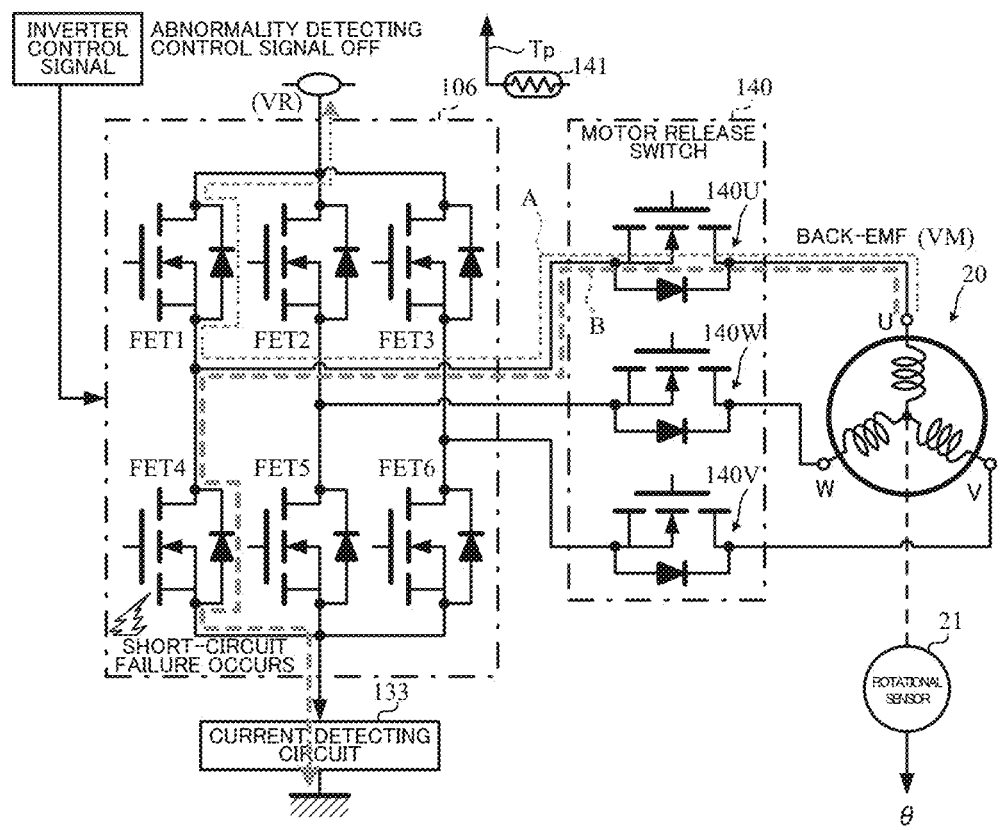
FIG. 12 is a circuit diagram for explaining a current path in an abnormal mode.

FIG. 12 is a circuit diagram showing a difference of a regenerative current path depending on the abnormal mode. When the abnormality is detected, the control signal of the inverter 106 is turned-OFF. At this time, when the motor rotates by means of the external force, the back-EMF VM is generated between the motor terminals. The back-EMF VM is proportional to the motor rotational speed as shown in Equation 1.

The regenerative current paths are divided into a path A and a path B depending on the abnormal mode.

(1) The Path A: The Abnormality Other than the Short Circuit Failure of the Inverter FET When the regenerative voltage is larger than the power supply voltage (+the forward voltage of the internal parasitic diode of the inverter), the regenerative current passes toward the power supply voltage through the internal parasitic diode of the High-side FETs (FET1 to FET3) of the inverter 106. At this time, a current Ir1 is calculated by the following Equation 2.

$$Ir1=(VM-VR-Vf)/R \qquad \text{(Equation 2)}$$

Here, "Vf" is the forward voltage of the internal parasitic diode of the FETs, and "R" is a circuit resistance that the regenerative current passes.

(2) The Path B: The Abnormality of the Short Circuit Failure of the Inverter FET On the other hand, when the short circuit failure in the Low-side FETs (FET4 to FET6) of the inverter 106 is occurred, the regenerative current passes to the ground (GND) through the FET in which the short circuit failure is occurred, and the current detecting circuit 133. The current Ir2 at this time is calculated by the following Equation 3.

$$Ir2=VM/(R+Rsh) \qquad \text{(Equation 3)}$$

Here, Rsh is a resistance in the current detecting circuit 133, and is generally used to a micro-miniature resistor.

In a case that the same back-EMF VM is generated, when the regenerative current Ir1 is compared with the regenerative current Ir2, generally the following Equation 4 is satisfied.

$$Ir2>Ir1 \qquad \text{(Equation 4)}$$

These regenerative currents Ir1 and Ir2 are in advance measured depending on the motor rotational speed, are stored in the memory of the ECU and the like as the table, and are used to calculate the regenerative electric power.

TABLE 1

| rotational speed [rpm] | VM [V] | Ir1 [A] | Ir2 [A] |
| --- | --- | --- | --- |
| 500 | 2.5 | 5 | 8 |
| 1000 | 5 | 10 | 15 |
| 2000 | 10 | 20 | 30 |
| ... | ... | ... | ... |

Figure 13:
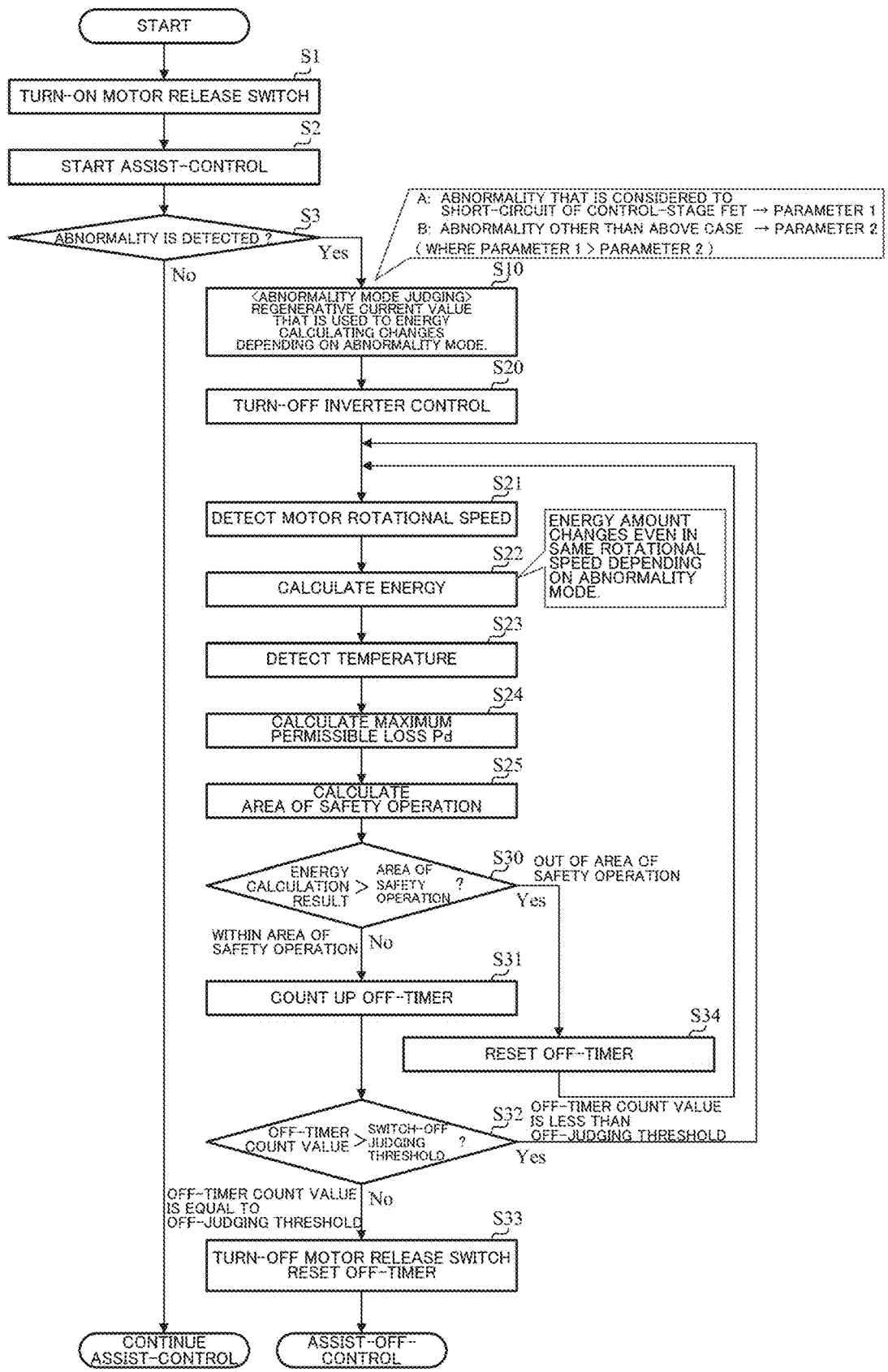
FIG. 13 is a flowchart showing the operation example of the present invention (the second embodiment)

In such a configuration, the operation example will be described with reference to the flowchart of FIG. 13. The flowchart of FIG. 13 is corresponding to that of FIG. 10, and the same step numeral is assigned to the same operation.

When the control operation is started, the operations are the same as the above first embodiment from the Step S1 to the Step S3. In the present embodiment, in a case that the abnormality is detected at the Step S3, the motor control unit judges the abnormality mode (Step S10). That is, the state detecting section 125 judges whether the abnormality that is considered to the short circuit of the control stage-FETs is occurred or the abnormality other than the above case is occurred, based on the detection results of the sensor abnormality detecting section 131 and the inverter abnormality detecting section 135. In a case that the abnormality that is considered to the short circuit of the control stage-FETs is occurred, a parameter 1 is set, and in a case that the abnormality other than the above case is occurred, a parameter 2 is set. Here, the parameter 1 is larger than the parameter 2 (the parameter 1>the parameter 2). That is, the parameter 1 and the parameter 2 are set in accordance with the following Equation 5.

(Equation 5)

the abnormality that is considered to the short circuit of the control stage-FETs→set the parameter 1 (a)

the abnormality other than the above case→set the parameter 2(<the parameter 1) (b)

In a case that the abnormality is detected, the motor control unit judges that the continuation of the assist-control is impossible, and the control section 120 turns-OFF the control of the inverter 106 (Step S30). After this process, the operations are the same as that of the first embodiment. Since the parameter 1 or the parameter 2 is set depending on the abnormality mode in the second embodiment, in the energy calculation at the Step S22, the different energy value is calculated even in a case of the same motor rotational speed.

Thereby, without destroying the FETs that constitutes the motor release switch 140, the process that needs to stop the assist-control is performed after the motor release switch 140 turns-OFF.

Next, the third embodiment according to the present invention will be described with reference to FIG. 14.

Figure 14:
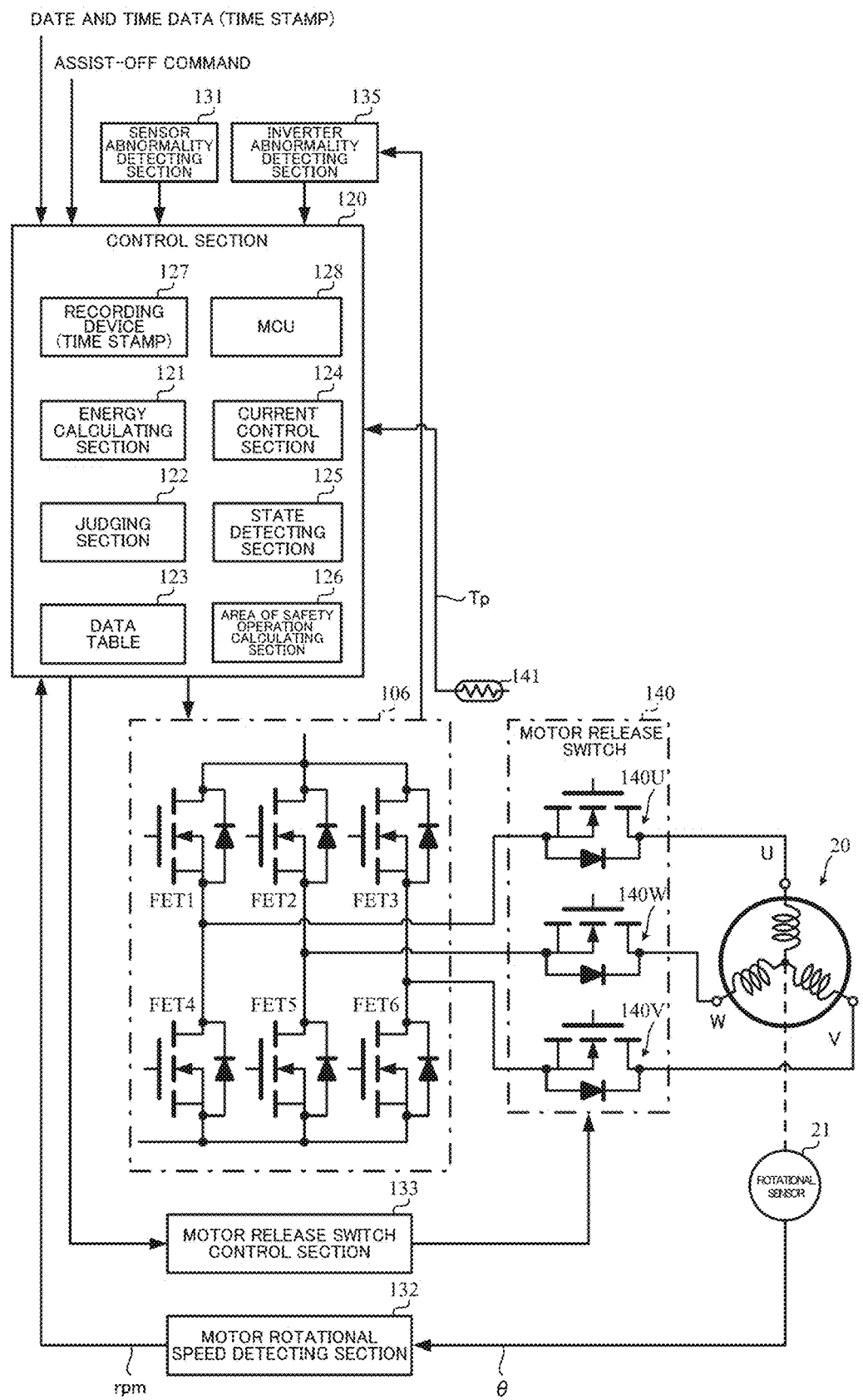
FIG. 14 is a block diagram showing the configuration example of the present invention (the third embodiment)

FIG. 14 is corresponding to FIG. 6 and FIG. 11, and in the third embodiment, the control section 120 comprises the energy calculating section 121, the judging section 122, the data table 123, the current control section 124, the state detecting section 125, the area of safety operation calculating section 126, a recording device and the MCU 128 to perform the overall control of the above sections. The date and time data (timestamp) is also inputted into the control section 120. The data table 123 stores the energy W corresponding to the motor rotational speed rpm, which is in advance calculated, and has a characteristic as shown in FIG. 7. As described above, the sensor abnormality detecting section 131, the inverter abnormality detecting section 135 and the state detecting section 125 are similarly provided.

When the abnormality is detected or the MCU 128 is reset, the recording device 127 records at least the temperature information Tp and the occurred date and time information (the timestamp). The judging section 122 compares the recorded temperature information and the occurred date and time information in resetting the MCU 128 with the temperature detection value and the recover date and time in recovering from the reset, and judges whether the difference between the occurred date and time and the recovering date and time, and the difference between the temperature information and the temperature detection value are within the respective predetermined ranges or not.

The following reasons (1) to (4) are considered as the occurring factors of the unexpected MCU-reset such as cranking, (1) restarting the engine in a start-stop system when waiting for the traffic light or the like, (2) restarting the engine from the state that the vehicle detects the long downward slope running and the engine is stopped (for improving the fuel consumption), (3) restarting the engine due to the torque demand when the vehicle detects the running that is equal to or less than the predetermined speed (for example, about 14 (km/h)) and the engine is stopped (for improving the fuel consumption), and (4) the influence of the noise, the latch-up of the device, or the like. In the factor (1) to the factor (3), when the battery is deterioration, the MCU-reset can be occurred.

In the interrupt handling when the MCU 128 is reset at an instantaneous stop reset time, the temperature information from the thermistor 141 of the temperature detecting section and the motor estimating temperature information and the timestamp information (Δ year Δ month Δ day, and ○ hour ○ minute ○ second) are recorded in the recording device 127.

Further, the condition that the FETs of the motor release switch are turned-ON again is as follows.

After the MCU 128 is restarted (the reset is released), the energy is more accurately calculated by calculating the energy from the rotational speed rpm of the motor 20 and calculating the maximum permissible loss from the temperature information Tp of the thermistor 141. The FETs of the motor release switch can safely be protected by turning-ON the FETU to the FETW of the motor release switch 140 again after the energy is within the area of safety operation. In addition, when the MCU 128 is reset by means of the instantaneous stop, the motor estimating temperature is once reset. Then, in a case that the temperature is equal to or higher than a certain temperature, when the current is passed through the FETs of the motor release switch, the risk that the abnormality such as the motor coil burnout is occurred, is existed.

Consequently, in the present embodiment, after the FETs of the motor release switch are turned-ON again, the control section 120 reads the timestamp information (the date and time information), and performs the following process. An arbitrary time that the temperature information Tp of the thermistor 141 is not almost varied is set as "Ta". When satisfying the following Equation 6, the control section 120 judges that the temperature is not almost varied, and continues the control by using the recorded motor estimating temperature information.

the present timestamp−the recorded time stamp<$Ta$    (Equation 6)

the present timestamp−the recorded time stamp≥$Ta$    (Equation 7)

In satisfying the above Equation 7, in a case of "the present temperature information≅the recorded temperature information", the control section 120 judges that the temperature is not almost varied, and continues the control by using the recorded motor estimating temperature information. In a case of "the present temperature information≠the recorded temperature information", the control section 120 judges that the temperature information is uncertain, performs the torque limiting (the current limiting), and performs the control of restricting the temperature increase.

Figure 15:
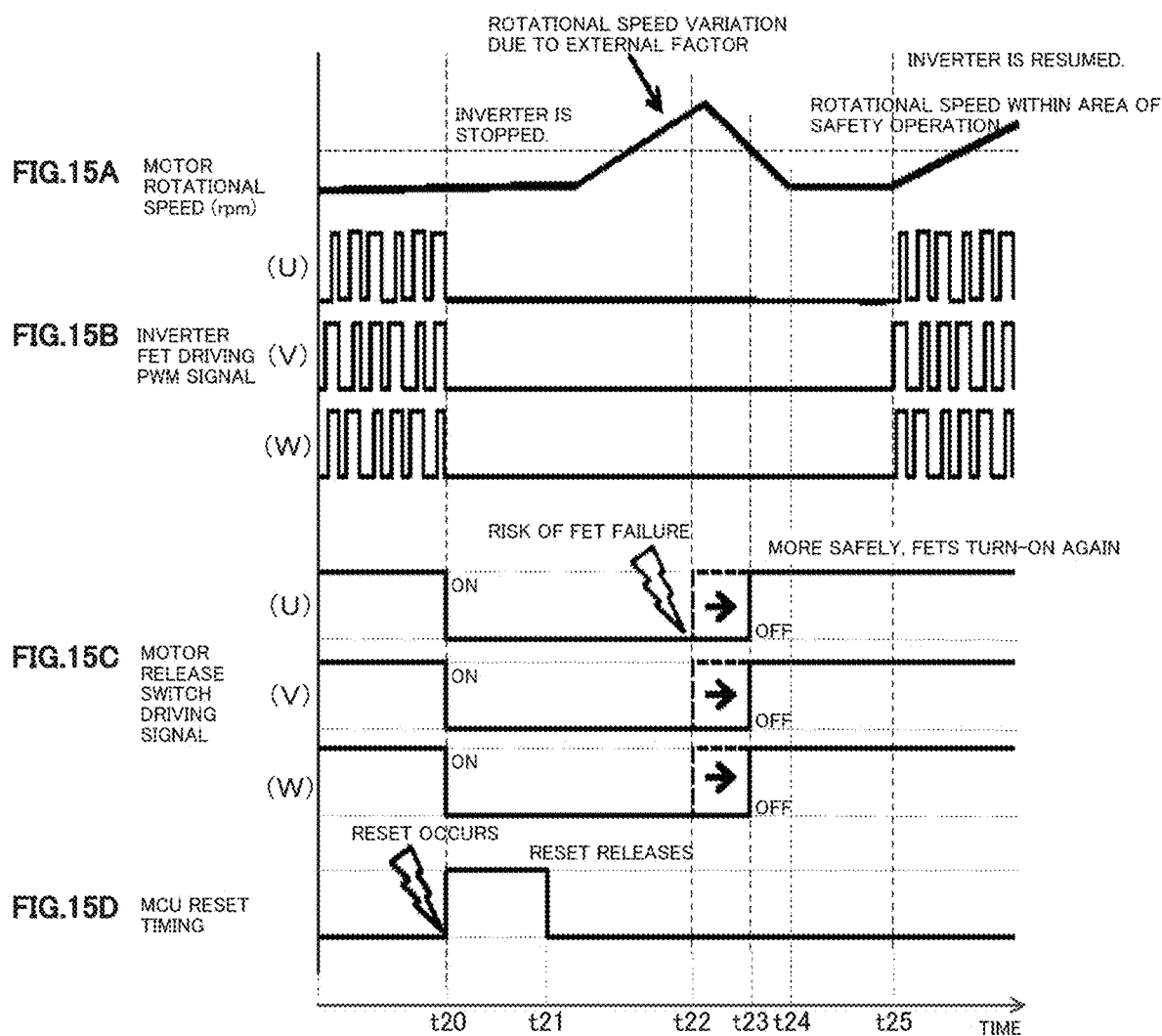
FIGS. 15A to 15D are a timing chart showing a principle of the present invention (the third embodiment)

When the MCU 128 is reset at a time point t20 as shown in FIG. 15D, the inverter is stopped (OFF) as shown in FIG. 15B, and the driving signal of the motor release switch 140 is turned-OFF as shown in FIG. 15C. By resetting the MCU 128, the inverter 106 and the motor release switch 140 are once stopped (OFF). However, as shown in FIG. 15D, after recovering the reset of the MCU 128 (that is, after at a time point t21), if the abnormality is not occurred especially, the inverter 106 and the motor release switch 140 needs to restart. When the motor release switch 140 turns-ON again as shown in FIG. 15A, the motor 20 rotates by the external force and the like. In a case that the regenerative electric power (the back-EMF and the regenerative current) is out of the area of safety operation of the FETs, the risk that the devices are destroyed is existed as well as turning-OFF the motor release switch 140.

Thus, in the present embodiment, comparing the regenerative electric power (the energy) with the area of the safe operation, in a case that the regenerative electric power is out of the area of safety operation and the control section 120 judges that the device destruction can be occurred as shown in FIG. 15C, the FETs continues the OFF-state (around a time point t22), and the FETs of the motor release switch 140 are turned-ON again after the possibility that the devices are destroyed is not existed (at a time point t23). Further, when the inverter 106 is driven again, the following conditions (a) to (c) are required.

(a) The temperature of the thermistor 141 is normally measured.

(b) The reset period is within a predetermined time.

(c) A difference between the recorded temperature information when the reset occurred and the acquired temperature information after the reset release, is within a predetermined temperature difference.

If the above conditions (a) to (c) are not satisfied, the inverter 106 is driven after setting the torque limiting of the motor 20 (the limiting is variable depending on the difference between the recorded temperature information and the detected temperature information). The reason for limiting the torque is that: although the motor temperature in operating is generally estimated from the temperature information of the interior of the ECU and the accumulated value of the motor control current, it is impossible to accurately perform the temperature estimation if the accumulated information is once cleared by means of the MCU reset and so on. Then, in a case that the normal control is performed in a state that the estimated temperature is lower than the actual motor temperature, since the risk that the coil damage of the motor is occurred is existed, it is necessary to perform the current limiting and protect the motor.

Figure 16:
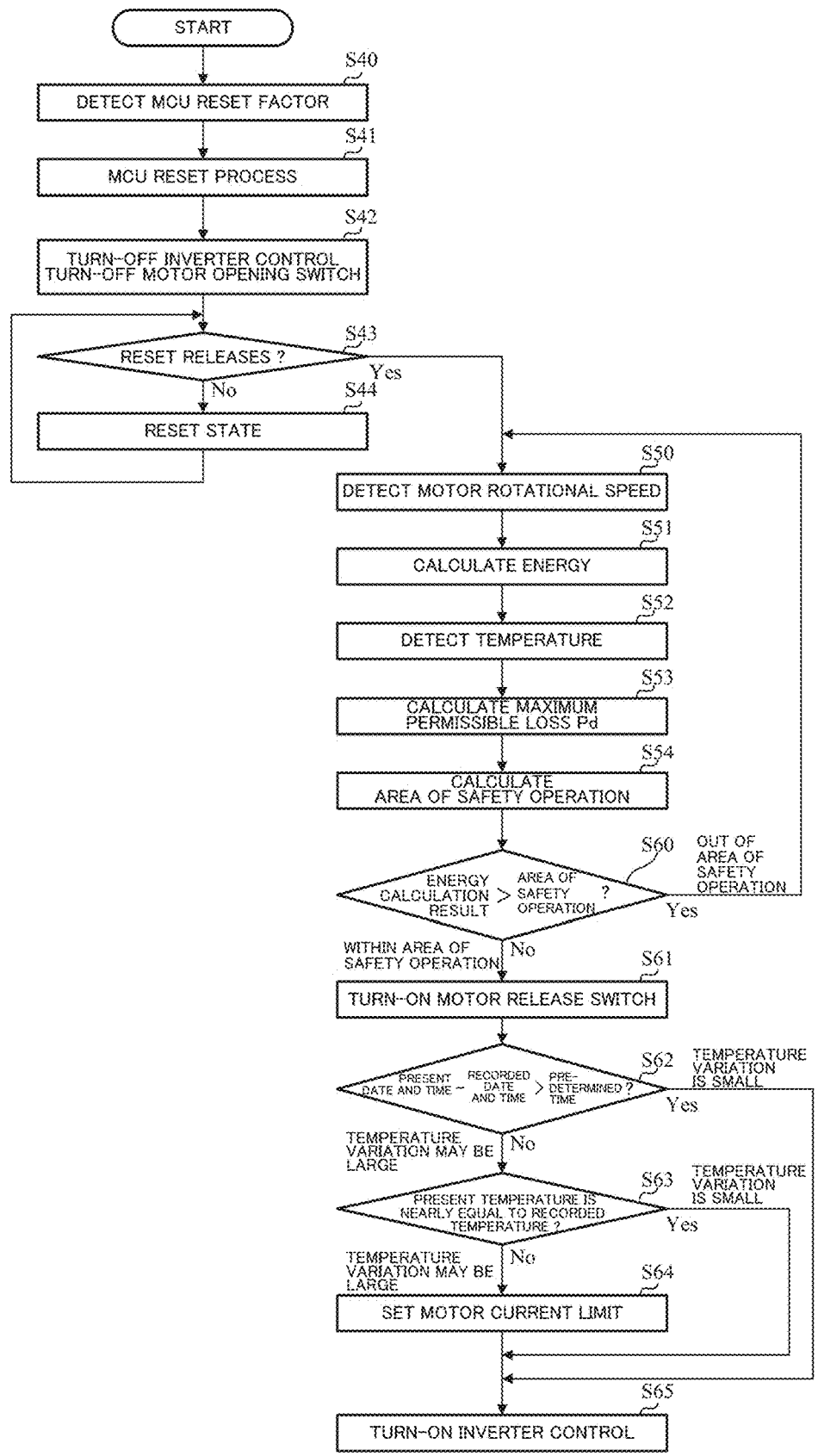
FIG. 16 is a flowchart showing the operation example of the present invention (the third embodiment).

In such a configuration, the operation example will be described with reference to the flowchart of FIG. 16.

In a state that the assist control is performed (the motor release switch 140 (140U, 140V and 140W) are turned-ON), when the factor of resetting the MCU 128 is detected (Step S40), the MCU 128 is reset (Step S41) and the inverter control and the motor release switch 140 are turned-OFF (Step S42). When resetting, the date and time information (the time stamp) and the temperature information from the thermistor 141 are recorded in the recording device 127. Until the reset of the MCU 128 is released (Step S43), the reset state is continued (Step S44).

When the reset is released at the above Step S43, the recovering control is started, the motor rotational detecting section 132 detects the motor rotational speed rpm of the motor 20 (Step S50), and the energy calculating section 121 in the control section 120 calculates the motor back-EMF E and the energy W of the regenerative current by using the data table 123 based on the motor rotational speed rpm (Step S51). The motor back-EMF is calculated in accordance with the above Equation 1 and the data of the motor back-EMF E and the regenerative current that are in advance measured are stored in the data table.

The temperature Tp of the motor release switch 140 (or the temperature around the motor release switch) is detected by the thermistor 141 (Step S52), and further the maximum permissible loss Pd is calculated (Step S53). The temperature Tp of the motor release switch 140 and the maximum permissible loss Pd are inputted into the control section 120. The area of safety operation of the motor release switch 140 is calculated based on the temperature Tp and the maximum permissible loss Pd (Step S54).

The calculated area of safety operation is inputted into the judging section 122 and the judging section 122 judges whether the calculated energy W is out of the area of safety operation of the FETs that constitutes the motor release switch 140 or not (Step S60). The judging section 122 judges whether "the energy calculation result>the area of safety operation" is satisfied or not. In a case that the calculated energy W is out of the calculated area of safety operation, that is, in a case that the motor rotational speed rpm is high, the calculated energy W is within the range having the risk that the regenerative electric power causes the FET-destruction, and the turning-OFF operation of the motor release switch 140 is continued. Thereby, the control that the regenerative current is returned to the power supply is performed, and the brake torque is applied to the rotating motor.

The motor rotational speed rpm gradually decreases by the brake torque. When the area of safety block of the motor release switch 140, that is, the energy W is within the area that the switching loss due to the regenerative current is within the area of safety operation (at the time point t23 in FIG. 15), the motor release switch 140 is turned-ON (Step S61). Then, the satisfaction of the above Equation 6 or Equation 7 is judged (Step S62). In a case that the Equation 7 is satisfied, the possibility of the temperature variation is existed. Further, the satisfaction of "the present temperature≅the recorded temperature" is judged (Step S63). In a case that "the present temperature≅the recorded temperature" is not satisfied, the temperature variation may be large, and the motor control unit sets to limit the motor current (Step S64), turns-ON the inverter control and performs the assist-control with the limited current (Step S65).

At the above Step S62, when the Equation 6 is satisfied, the temperature variation is small. At the above Step S63, in a case that "the present temperature≅the recorded temperature" is satisfied, the temperature variation is also small. In both cases, the motor control unit turns-ON the inverter control and performs the assist-control (Step S65).

The determining section 122 performs the judging by using the numeric data such as withstand voltage data and the area of safety operation. Since the motor rotational speed when the motor release switch turns-OFF is largely varied due to the type of the using motor, the FETs, the wiring resistance and the like, in a comparison with the withstand voltage data and the area of safety operation, the above motor rotational speed is derived by the measurement in an actual machine and the like. In a case that the motor current is limited, the current limiting release is performed after confirming that the motor control unit recovers to the normal state when the ignition key is turned-OFF.

Although the motor rotational speed is detected based on the rotational sensor (a resolver) in the above embodiments, the motor rotational speed can be estimated by using the motor terminal voltage and the current detecting by means of the shunt resistor.

Although the thermistor is exemplified as the temperature sensor in the above embodiments, a resistance temperature detector, a thermocouple, an IC temperature sensor that utilizes a temperature characteristic of a transistor, a quartz thermometer that utilizes a Y-cut quartz crystal and the like can also utilize as the temperature sensor.

EXPLANATION OF REFERENCE NUMERALS 1 handle
2 column shaft (steering shaft, handle shaft)
10 torque sensor
20 motor
100 control unit (ECU)
106 inverter
120 control section
121 energy calculating section
122 judging section
122A timer
123 data table
125 state detecting section
126 area of safety operation calculating section
127 recording device
128 MCU
131 sensor abnormality detecting section
132 motor rotational speed detecting section
133 motor release switch control section
140 motor release switch
141 thermistor

The invention claimed is:

1. A motor control unit that driving-controls a motor by an inverter based on a current command value calculated with a steering torque from a torque sensor, and a motor release switch, included in said motor control unit and comprised of field-effect transistors (FETs), is connected between said inverter and said motor, comprising:
    a control section to detect states of sensors including said torque sensor and an assist state of said inverter, to turn-ON or turn-OFF a control of said inverter based on a detection result and to detect whether an abnormality is existed or not;
    a motor rotational speed detecting section to detect a motor rotational speed of said motor;
    an energy calculating section to select a motor back electromotive force voltage (a motor back-EMF) and regenerative currents by using a data table based on said motor rotational speed and to calculate an energy by using data thereof;
    a judging section to turn-OFF all of said FETs of said motor release switch when said energy is compared with an area of safety operation of said FETs and said energy is within said area of safety operation; and
    a state detecting section to detect whether an abnormality is existed or not based on information from an abnormality detecting section that detects an abnormality of said sensors and said inverter,
    wherein said control section turns-ON said control of said inverter when said state detecting section does not detect said abnormality and turns-OFF said control of said inverter when said state detecting section detects said abnormality,
    wherein a temperature detecting section to detect a temperature of said FETs or a temperature around said FETs is provided, and said control section calculates said area of safety operation depending on said temperature by calculating said area of safety operation based on a temperature detection value that is detected at said temperature detecting section,
    wherein a timer is provided in said judging section,
    wherein said timer is reset when said energy is out of said area of safety operation, and said timer is counted-up when said energy is within said area of safety operation,
    wherein a time that said energy is within said area of safety operation is measured by said timer, and an FET-OFF signal is outputted when a state that said energy is within said area of safety operation continues for a predetermined time, and
    wherein a current to calculate said energy is selected from said regenerative currents depending on an abnormality mode detected at said state detecting section.

2. The motor control unit according to claim 1, wherein, in said judging section, in a case that an abnormality detected at said state detecting section is a short circuit failure of said inverter, a larger current is selected as said regenerative current, and in a case of abnormality other than said short circuit failure, a smaller current is selected as said regenerative current.

3. The motor control unit according to claim 2, wherein said FETs are protected by judging based on energy that is calculated by a selected regenerative current depending on said abnormality mode.

4. The motor control unit according to claim 1, wherein said FETs are protected by judging based on energy that is calculated by a selected regenerative current depending on said abnormality mode.

5. A motor control unit that driving-controls a motor by an inverter comprising first field-effect transistors (FETs) based on a current command value calculated by using at least a steering torque from a torque sensor, and a motor release switch, included in said motor control unit and comprised of second FETs, is connected between said inverter and said motor, comprising:
    a control section to detect states of sensors including said torque sensor and an assist state of said inverter, to turn-ON or turn-OFF a control of said inverter based on a detection result and to detect whether an abnormality is existed or not;
    a motor rotational speed detecting section to detect a motor rotational speed of said motor;
    an energy calculating section to calculate an energy of a motor electromotive force voltage (a motor back-EMF) and regenerative currents by means of a data table based on said motor rotational speed;
    a judging section to turn-OFF all of said second FETs when said energy is compared with an area of safety operation of said second FETs and said energy is within said area of safety operation; and
    a state detecting section to detect an abnormality mode based on information from an abnormality detecting section that detects an abnormality of said sensors and said inverter,
    wherein said control section turns-ON said control of said inverter when said state detecting section does not detect said abnormality and turns-OFF said control of said inverter when said state detecting section detects said abnormality, and
    wherein one of said regenerative currents is selected from plural currents depending on said abnormality mode detected at said state detecting section, and said energy is calculated based on said selected regenerative current.

6. The motor control unit according to claim 5, wherein a temperature detecting section to detect a temperature of said first FETs or a temperature around said first FETs is provided, and said control section calculates said area of safety operation based on a temperature detecting value that is detected at said temperature detecting section.

7. The motor control unit according to claim 6, wherein said abnormality mode is divided into a first abnormality of said inverter and a second abnormality other than said first abnormality of said inverter.

8. The motor control unit according to claim 5, wherein said abnormality mode is divided into a first abnormality of said inverter and a second abnormality other than said first abnormality of said inverter.

9. The motor control unit according to claim 8, wherein, in a case that said abnormality mode is said first abnormality of said inverter, a larger current is selected as said regenerative current, and in a case that said second abnormality is other than said first abnormality, a smaller current is selected as said regenerative current.

10. A motor control unit that driving-controls a motor by an inverter comprising first field-effect transistors (FETs) based on a current command value calculated by using at least a steering torque from a torque sensor, and a motor release switch, included in said motor control unit and comprised of second FETs, is connected between said inverter and said motor, comprising:
    a control section including a micro controller unit (MCU) to detect states of sensors including said torque sensor and an assist state of said inverter, to turn-ON or turn-OFF a control of said inverter based on a detection result and to detect whether an abnormality is existed or not;

a motor rotational speed detecting section to detect a motor rotational speed of said motor;

an energy calculating section to calculate a motor back-electromotive force voltage (a motor back-EMF) and a regenerative current energy by means of a data table based on said motor rotational speed;

an energy calculating section to select a motor back-EMF and a regenerative current by means of a data table based on said motor rotational speed and to calculate an energy by using data thereof;

a judging section to judge that a timer is provided, said energy is compared with an area of safety operation of said second FETs, said timer is reset when said energy is out of said area of safety operation, said timer is counted-up when said energy is within said area of safety operation, a time that said energy is within said area of safety operation is measured by said timer, and all of said second FETs are turned-OFF when said time continues for a predetermined time;

a state detecting section to detect whether said abnormality is existed or not based on information from an abnormality detecting section that detects said abnormality of said sensors and said inverter;

a temperature detecting section to detect a temperature of said first FETs or a temperature around said first FETs; and a recording device to record at least said temperature detected at said temperature detecting section, a first date and time information and a first temperature information which are recorded at occurrence of an abnormality detection at said state detecting section and a reset time of said MCU, a second date and time information and a second temperature information which are recorded at a recovering time of said MCU, wherein said control section turns-ON said control of said inverter when said state detecting section does not detect said abnormality and turns-OFF said control of said inverter when said state detecting section detects said abnormality, wherein said judging section obtains a first difference between said first date and time information and said second date and time information as well as a second difference between said first temperature information and said second temperature information, and judges whether said first difference and said second difference are respectively within predetermined ranges or not, and wherein said control section determines whether currents flowing to said motor are limited or not based on a judgment result.

11. The motor control unit according to claim 10, wherein said judging section compares a temperature information and occurring date and time which are recorded at a resetting time of said MCU with a temperature detection value and recovering date and time at a recovering time from said resetting time, and judges whether differences between said occurring date and time and said recovering date and time and a difference between said temperature information and said temperature detection value are respectively within predetermined ranges or not.

12. The motor control unit according to claim 11, wherein said second FETs are turned-ON again after said energy is within said area of safety operation.

13. The motor control unit according to claim 10, wherein said second FETs are turned-ON again after said energy is within said area of safety operation.

14. The motor control unit according to claim 13, wherein, after said second FETs are turned-ON again, said date and time information are read, differences between present date and time information and recorded date and time information are calculated, a control of said motor is continued when said difference is less than a predetermined value, and a current limiting to said motor is performed when said difference is equal to or more than a predetermined value.

15. An electric power steering apparatus provided with said motor control unit according to claim 1.

* * * * *